United States Patent
Beveridge

(10) Patent No.: US 12,526,183 B2
(45) Date of Patent: Jan. 13, 2026

(54) DYNAMIC USE OF MULTIPLE WIRELESS NETWORK LINKS TO CONNECT A VEHICLE TO AN SD-WAN

(71) Applicant: VMware LLC, Palo Alto, CA (US)

(72) Inventor: Daniel J. Beveridge, Valrico, FL (US)

(73) Assignee: VMware LLC, Palo Alto, CA (US)

( * ) Notice: Subject to any disclaimer, the term of this patent is extended or adjusted under 35 U.S.C. 154(b) by 306 days.

(21) Appl. No.: 18/100,369

(22) Filed: Jan. 23, 2023

(65) Prior Publication Data

US 2024/0073085 A1 Feb. 29, 2024

Related U.S. Application Data

(60) Provisional application No. 63/401,708, filed on Aug. 28, 2022.

(51) Int. Cl.
*H04L 41/0803* (2022.01)
*H04L 43/028* (2022.01)
(Continued)

(52) U.S. Cl.
CPC ........ *H04L 41/0803* (2013.01); *H04L 43/028* (2013.01); *H04L 47/28* (2013.01);
(Continued)

(58) Field of Classification Search
CPC ... H04L 41/0803; H04L 43/028; H04L 47/28; H04L 43/50; H04L 41/40; H04L 43/0888;
(Continued)

(56) References Cited

U.S. PATENT DOCUMENTS

| | | |
|---|---|---|
| 5,652,751 A | 7/1997 | Sharony |
| 5,909,553 A | 6/1999 | Campbell et al. |

(Continued)

FOREIGN PATENT DOCUMENTS

| | | |
|---|---|---|
| CN | 1483270 A | 3/2004 |
| CN | 1926809 A | 3/2007 |

(Continued)

OTHER PUBLICATIONS

Non-Published Commonly Owned U.S. Appl. No. 18/222,864, filed Jul. 17, 2023, 350 pages, VMware, Inc.

(Continued)

*Primary Examiner* — Wutchung Chu
(74) *Attorney, Agent, or Firm* — Kim & Stewart LLP

(57) ABSTRACT

Some embodiments provide a novel method for connecting one or more vehicles to a software defined wide area network (SD-WAN). The method deploys an edge router to operate in the vehicle, and configures the edge router to connect to several wireless network links (e.g., 5G cellular links) operating in the vehicle. In some embodiments, the different wireless network links are different mobile hotspot links provided by different telecommunication network providers (e.g., AT&T, Verizon, T-Mobile, Orange, etc.). The method configures the edge router to forward several data message flows from a device operating in the vehicle (e.g., a computer located in the vehicle or a machine (e.g., virtual machine, Pod, container, etc.) executing on a computer located in the vehicle) to the SD-WAN using the several telecommunications network links.

21 Claims, 18 Drawing Sheets

(51) Int. Cl.
- *H04L 47/28* (2022.01)
- *H04W 28/02* (2009.01)
- *H04W 28/08* (2023.01)
- *H04W 28/082* (2023.01)
- *H04W 64/00* (2009.01)
- *H04W 76/15* (2018.01)
- *H04W 84/02* (2009.01)

(52) U.S. Cl.
CPC ..... *H04W 28/0273* (2013.01); *H04W 28/082* (2023.05); *H04W 28/0942* (2020.05); *H04W 28/0958* (2020.05); *H04W 64/006* (2013.01); *H04W 76/15* (2018.02); *H04W 84/02* (2013.01)

(58) Field of Classification Search
CPC .... H04L 43/20; H04L 45/64; H04W 28/0273; H04W 28/082; H04W 28/0942; H04W 28/0958; H04W 64/006; H04W 76/15; H04W 84/02
See application file for complete search history.

(56) References Cited

U.S. PATENT DOCUMENTS

| | | |
|---|---|---|
| 6,154,465 A | 11/2000 | Pickett |
| 6,157,648 A | 12/2000 | Voit et al. |
| 6,201,810 B1 | 3/2001 | Masuda et al. |
| 6,363,378 B1 | 3/2002 | Conklin et al. |
| 6,445,682 B1 | 9/2002 | Weitz |
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,751,409 B1 | 7/2010 | Carolan |
| 7,962,458 B2 | 6/2011 | Holenstein et al. |
| 8,051,185 B2 | 11/2011 | Lee et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,516,129 B1 | 8/2013 | Skene |
| 8,566,452 B1 | 10/2013 | Goodwin, III et al. |
| 8,588,066 B2 | 11/2013 | Goel et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,769,129 B2 | 7/2014 | Watsen et al. |
| 8,797,874 B2 | 8/2014 | Yu et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,015,299 B1 | 4/2015 | Shah |
| 9,019,837 B2 | 4/2015 | Lue et al. |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,100,329 B1 | 8/2015 | Jiang et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,225,591 B2 | 12/2015 | Beheshti-Zavareh et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,542,219 B1 | 1/2017 | Bryant et al. |
| 9,559,951 B1 | 1/2017 | Sajassi et al. |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,614,748 B1 | 4/2017 | Battersby et al. |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,692,714 B1 | 6/2017 | Nair et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,923,826 B2 | 3/2018 | Murgia |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 9,996,370 B1 | 6/2018 | Khafizov et al. |
| 10,038,601 B1 | 7/2018 | Becker et al. |
| 10,057,183 B2 | 8/2018 | Salle et al. |
| 10,057,294 B2 | 8/2018 | Xu |
| 10,116,593 B1 | 10/2018 | Sinn et al. |
| 10,135,789 B2 | 11/2018 | Mayya et al. |
| 10,142,226 B1 | 11/2018 | Wu et al. |
| 10,178,032 B1 | 1/2019 | Freitas |
| 10,178,037 B2 | 1/2019 | Appleby et al. |
| 10,187,289 B1 | 1/2019 | Chen et al. |
| 10,200,264 B2 | 2/2019 | Menon et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,263,848 B2 | 4/2019 | Wolting |
| 10,320,664 B2 | 6/2019 | Nainar et al. |
| 10,320,691 B1 | 6/2019 | Matthews et al. |
| 10,326,830 B1 | 6/2019 | Singh |

(56) References Cited

U.S. PATENT DOCUMENTS

| | | |
|---|---|---|
| 10,348,767 B1 | 7/2019 | Lee et al. |
| 10,355,989 B1 | 7/2019 | Panchal et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,567,519 B1 | 2/2020 | Mukhopadhyaya et al. |
| 10,574,482 B2 | 2/2020 | Oré et al. |
| 10,574,528 B2 | 2/2020 | Mayya et al. |
| 10,594,516 B2 | 3/2020 | Cidon et al. |
| 10,594,591 B2 | 3/2020 | Houjyo et al. |
| 10,594,659 B2 | 3/2020 | El-Moussa et al. |
| 10,608,844 B2 | 3/2020 | Cidon et al. |
| 10,630,505 B2 | 4/2020 | Rubenstein et al. |
| 10,637,889 B2 | 4/2020 | Ermagan et al. |
| 10,666,460 B2 | 5/2020 | Cidon et al. |
| 10,666,497 B2 | 5/2020 | Tahhan et al. |
| 10,686,625 B2 | 6/2020 | Cidon et al. |
| 10,693,739 B1 | 6/2020 | Naseri et al. |
| 10,708,144 B2 | 7/2020 | Mohan et al. |
| 10,715,382 B2 | 7/2020 | Guan et al. |
| 10,715,427 B2 | 7/2020 | Raj et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,778,557 B2 | 9/2020 | Ganichev et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,924,388 B1 | 2/2021 | Burns et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 10,999,197 B2 | 5/2021 | Hooda et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,595 B2 | 8/2021 | Knutsen et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,146,632 B2 | 10/2021 | Rubenstein |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,310,170 B2 | 4/2022 | Cidon et al. |
| 11,323,307 B2 | 5/2022 | Mayya et al. |
| 11,349,722 B2 | 5/2022 | Mayya et al. |
| 11,363,124 B2 | 6/2022 | Markuze et al. |
| 11,374,904 B2 | 6/2022 | Mayya et al. |
| 11,375,005 B1 | 6/2022 | Rolando et al. |
| 11,381,474 B1 | 7/2022 | Kumar et al. |
| 11,381,499 B1 | 7/2022 | Ramaswamy et al. |
| 11,388,086 B1 | 7/2022 | Ramaswamy et al. |
| 11,394,640 B2 | 7/2022 | Ramaswamy et al. |
| 11,418,997 B2 | 8/2022 | Devadoss et al. |
| 11,438,789 B2 | 9/2022 | Devadoss et al. |
| 11,444,865 B2 | 9/2022 | Ramaswamy et al. |
| 11,444,872 B2 | 9/2022 | Mayya et al. |
| 11,477,127 B2 | 10/2022 | Ramaswamy et al. |
| 11,489,720 B1 | 11/2022 | Kempanna et al. |
| 11,489,783 B2 | 11/2022 | Ramaswamy et al. |
| 11,509,571 B1 | 11/2022 | Ramaswamy et al. |
| 11,516,049 B2 | 11/2022 | Cidon et al. |
| 11,522,780 B1 | 12/2022 | Wallace et al. |
| 11,526,434 B1 | 12/2022 | Brooker et al. |
| 11,533,248 B2 | 12/2022 | Mayya et al. |
| 11,552,874 B1 | 1/2023 | Pragada et al. |
| 11,575,591 B2 | 2/2023 | Ramaswamy et al. |
| 11,575,600 B2 | 2/2023 | Markuze et al. |
| 11,582,144 B2 | 2/2023 | Ramaswamy et al. |
| 11,582,298 B2 | 2/2023 | Hood et al. |
| 11,601,356 B2 | 3/2023 | Gandhi et al. |
| 11,606,225 B2 | 3/2023 | Cidon et al. |
| 11,606,286 B2 | 3/2023 | Michael et al. |
| 11,606,314 B2 | 3/2023 | Cidon et al. |
| 11,606,712 B2 | 3/2023 | Devadoss et al. |
| 11,611,507 B2 | 3/2023 | Ramaswamy et al. |
| 11,637,768 B2 | 4/2023 | Ramaswamy et al. |
| 11,677,720 B2 | 6/2023 | Mayya et al. |
| 11,689,959 B2 | 6/2023 | Devadoss et al. |
| 11,700,196 B2 | 7/2023 | Michael et al. |
| 11,706,126 B2 | 7/2023 | Silva et al. |
| 11,706,127 B2 | 7/2023 | Michael et al. |
| 11,709,710 B2 | 7/2023 | Markuze et al. |
| 11,716,286 B2 | 8/2023 | Ramaswamy et al. |
| 11,722,925 B2 | 8/2023 | Devadoss et al. |
| 11,729,065 B2 | 8/2023 | Ramaswamy et al. |
| 11,973,640 B1* | 4/2024 | Wang .................. H04L 41/064 |
| 2002/0049687 A1 | 4/2002 | Helsper et al. |
| 2002/0075542 A1 | 6/2002 | Kumar et al. |
| 2002/0085488 A1 | 7/2002 | Kobayashi |
| 2002/0087716 A1 | 7/2002 | Mustafa |
| 2002/0152306 A1 | 10/2002 | Tuck |
| 2002/0186682 A1 | 12/2002 | Kawano et al. |
| 2002/0198840 A1 | 12/2002 | Banka et al. |
| 2003/0050061 A1 | 3/2003 | Wu et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0161321 A1 | 8/2003 | Karam et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0149604 A1 | 7/2005 | Navada |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0210479 A1 | 9/2005 | Andjelic |
| 2005/0265255 A1 | 12/2005 | Kodialam et al. |
| 2006/0002291 A1 | 1/2006 | Alicherry et al. |
| 2006/0034335 A1 | 2/2006 | Karaoguz et al. |
| 2006/0114838 A1 | 6/2006 | Mandavilli et al. |

(56) References Cited

U.S. PATENT DOCUMENTS

| | | |
|---|---|---|
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2006/0195605 A1 | 8/2006 | Sundarrajan et al. |
| 2006/0245414 A1 | 11/2006 | Susai et al. |
| 2007/0050594 A1 | 3/2007 | Augsburg et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Aloni et al. |
| 2007/0162639 A1 | 7/2007 | Chu et al. |
| 2007/0177511 A1 | 8/2007 | Das et al. |
| 2007/0195797 A1 | 8/2007 | Patel et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0168086 A1 | 7/2008 | Miller et al. |
| 2008/0175150 A1 | 7/2008 | Bolt et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2008/0263218 A1 | 10/2008 | Beerends et al. |
| 2009/0013210 A1 | 1/2009 | McIntosh et al. |
| 2009/0028092 A1 | 1/2009 | Rothschild |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0182874 A1 | 7/2009 | Morford et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0098092 A1 | 4/2010 | Luo et al. |
| 2010/0100768 A1 | 4/2010 | Yamamoto et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0128600 A1 | 5/2010 | Srinivasmurthy et al. |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0001604 A1 | 1/2011 | Ludlow et al. |
| 2011/0007752 A1 | 1/2011 | Silva et al. |
| 2011/0032939 A1 | 2/2011 | Nozaki et al. |
| 2011/0035187 A1 | 2/2011 | DeJori et al. |
| 2011/0040814 A1 | 2/2011 | Higgins |
| 2011/0075674 A1 | 3/2011 | Li et al. |
| 2011/0078783 A1 | 3/2011 | Duan et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2011/0302663 A1 | 12/2011 | Prodan et al. |
| 2012/0008630 A1 | 1/2012 | Ould-Brahim |
| 2012/0027013 A1 | 2/2012 | Napierala |
| 2012/0039309 A1 | 2/2012 | Evans et al. |
| 2012/0099601 A1 | 4/2012 | Haddad et al. |
| 2012/0136697 A1 | 5/2012 | Peles et al. |
| 2012/0140935 A1 | 6/2012 | Kruglick |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0240185 A1 | 9/2012 | Kapoor et al. |
| 2012/0250682 A1 | 10/2012 | Vincent et al. |
| 2012/0250686 A1 | 10/2012 | Vincent et al. |
| 2012/0266026 A1 | 10/2012 | Chikkalingaiah et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0007505 A1 | 1/2013 | Spear |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103729 A1 | 4/2013 | Cooney et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128757 A1 | 5/2013 | Chowdhary et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173768 A1 | 7/2013 | Kundu et al. |
| 2013/0173788 A1 | 7/2013 | Song |
| 2013/0182712 A1 | 7/2013 | Aguayo et al. |
| 2013/0185446 A1 | 7/2013 | Zeng et al. |
| 2013/0185729 A1 | 7/2013 | Vasic et al. |
| 2013/0191688 A1 | 7/2013 | Agarwal et al. |
| 2013/0223226 A1 | 8/2013 | Narayanan et al. |
| 2013/0223454 A1 | 8/2013 | Dunbar et al. |
| 2013/0235870 A1 | 9/2013 | Tripathi et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0258939 A1 | 10/2013 | Wang |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0311086 A1* | 11/2013 | Aoki .......... G01C 21/3844 701/446 |
| 2013/0315242 A1 | 11/2013 | Wang et al. |
| 2013/0315243 A1 | 11/2013 | Huang et al. |

(56) References Cited

U.S. PATENT DOCUMENTS

| | | |
|---|---|---|
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0157363 A1 | 6/2014 | Banerjee |
| 2014/0160935 A1 | 6/2014 | Zecharia et al. |
| 2014/0164560 A1 | 6/2014 | Ko et al. |
| 2014/0164617 A1 | 6/2014 | Jalan et al. |
| 2014/0164718 A1 | 6/2014 | Schaik et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0189074 A1 | 7/2014 | Parker |
| 2014/0208317 A1 | 7/2014 | Nakagawa |
| 2014/0219135 A1 | 8/2014 | Li et al. |
| 2014/0223507 A1 | 8/2014 | Xu |
| 2014/0226664 A1 | 8/2014 | Chen et al. |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0310282 A1 | 10/2014 | Sprague et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0337674 A1 | 11/2014 | Ivancic et al. |
| 2014/0341109 A1 | 11/2014 | Cartmell et al. |
| 2014/0351394 A1 | 11/2014 | Elisha |
| 2014/0355441 A1 | 12/2014 | Jain |
| 2014/0365834 A1 | 12/2014 | Stone et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0100958 A1 | 4/2015 | Banavalikar et al. |
| 2015/0106809 A1 | 4/2015 | Reddy et al. |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0264055 A1 | 9/2015 | Budhani et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0326426 A1 | 11/2015 | Luo et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358232 A1 | 12/2015 | Chen et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381462 A1 | 12/2015 | Choi et al. |
| 2015/0381493 A1 | 12/2015 | Bansal et al. |
| 2016/0019317 A1 | 1/2016 | Pawar et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080268 A1 | 3/2016 | Anand et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134527 A1 | 5/2016 | Kwak et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0147607 A1 | 5/2016 | Dornemann et al. |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0171882 A1* | 6/2016 | Handley ............... G06Q 10/04 |
| | | 701/400 |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1 | 7/2016 | Cooper et al. |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0234099 A1 | 8/2016 | Jiao |
| 2016/0234161 A1 | 8/2016 | Banerjee et al. |
| 2016/0255169 A1 | 9/2016 | Kovvuri et al. |
| 2016/0255542 A1 | 9/2016 | Hughes et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |

(56) References Cited

U.S. PATENT DOCUMENTS

| | | |
|---|---|---|
| 2016/0269926 A1 | 9/2016 | Sundaram |
| 2016/0285736 A1 | 9/2016 | Gu |
| 2016/0299775 A1 | 10/2016 | Madapurath et al. |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0024260 A1 | 1/2017 | Chandrasekaran et al. |
| 2017/0026273 A1 | 1/2017 | Yao et al. |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063783 A1 | 3/2017 | Yong et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118067 A1 | 4/2017 | Vedula |
| 2017/0118173 A1 | 4/2017 | Arramreddy et al. |
| 2017/0123939 A1 | 5/2017 | Maheshwari et al. |
| 2017/0126475 A1 | 5/2017 | Mahkonen et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0155566 A1 | 6/2017 | Martinsen et al. |
| 2017/0155590 A1 | 6/2017 | Dillon et al. |
| 2017/0163473 A1 | 6/2017 | Sadana et al. |
| 2017/0163727 A1* | 6/2017 | Dolby .............. H04L 67/1095 |
| 2017/0171024 A1 | 6/2017 | Anerousis et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201568 A1 | 7/2017 | Hussam et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0236060 A1 | 8/2017 | Ignatyev |
| 2017/0237710 A1 | 8/2017 | Mayya et al. |
| 2017/0242784 A1 | 8/2017 | Heorhiadi et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302501 A1 | 10/2017 | Shi et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317945 A1 | 11/2017 | Guo et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339022 A1 | 11/2017 | Hegde et al. |
| 2017/0339054 A1 | 11/2017 | Yadav et al. |
| 2017/0339070 A1 | 11/2017 | Chang et al. |
| 2017/0346722 A1 | 11/2017 | Smith et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0041470 A1 | 2/2018 | Schultz et al. |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0091370 A1 | 3/2018 | Arai |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0176252 A1 | 6/2018 | Nimmagadda et al. |
| 2018/0181423 A1 | 6/2018 | Gunda et al. |
| 2018/0204119 A1* | 7/2018 | Anderson ............. B60W 40/09 |
| 2018/0205746 A1 | 7/2018 | Boutnaru et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0261085 A1 | 9/2018 | Liu et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |

(56) References Cited

U.S. PATENT DOCUMENTS

| | | |
|---|---|---|
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0359323 A1 | 12/2018 | Madden |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0021085 A1 | 1/2019 | Mochizuki et al. |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0081894 A1 | 3/2019 | Yousaf et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0104458 A1* | 4/2019 | Svennebring ............ H04L 45/42 |
| 2019/0109769 A1 | 4/2019 | Jain et al. |
| 2019/0126930 A1* | 5/2019 | Kim ........................ G01C 21/32 |
| 2019/0132221 A1 | 5/2019 | Boutros et al. |
| 2019/0132234 A1 | 5/2019 | Dong et al. |
| 2019/0132322 A1 | 5/2019 | Song et al. |
| 2019/0140889 A1 | 5/2019 | Mayya et al. |
| 2019/0140890 A1 | 5/2019 | Mayya et al. |
| 2019/0149525 A1 | 5/2019 | Gunda et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0222499 A1 | 7/2019 | Chen et al. |
| 2019/0238364 A1 | 8/2019 | Boutros et al. |
| 2019/0238446 A1 | 8/2019 | Barzik et al. |
| 2019/0238449 A1* | 8/2019 | Michael .................. H04L 45/70 |
| 2019/0238450 A1 | 8/2019 | Michael et al. |
| 2019/0238483 A1 | 8/2019 | Marichetty et al. |
| 2019/0238497 A1 | 8/2019 | Tourrilhes et al. |
| 2019/0268421 A1 | 8/2019 | Markuze et al. |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0288875 A1 | 9/2019 | Shen et al. |
| 2019/0306197 A1 | 10/2019 | Degioanni |
| 2019/0306282 A1 | 10/2019 | Masputra et al. |
| 2019/0313278 A1 | 10/2019 | Liu |
| 2019/0313907 A1 | 10/2019 | Khachaturian et al. |
| 2019/0319847 A1 | 10/2019 | Nahar et al. |
| 2019/0319881 A1 | 10/2019 | Maskara et al. |
| 2019/0327109 A1 | 10/2019 | Guichard et al. |
| 2019/0334786 A1 | 10/2019 | Dutta et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0067831 A1 | 2/2020 | Spraggins et al. |
| 2020/0092207 A1 | 3/2020 | Sipra et al. |
| 2020/0097327 A1 | 3/2020 | Beyer et al. |
| 2020/0099625 A1 | 3/2020 | Yigit et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0159661 A1 | 5/2020 | Keymolen et al. |
| 2020/0160701 A1* | 5/2020 | Mobasser ............ G08G 1/0145 |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0191576 A1* | 6/2020 | Zhang ................ G01C 21/3691 |
| 2020/0195557 A1 | 6/2020 | Duan et al. |
| 2020/0202708 A1* | 6/2020 | Fowe .................... G08G 1/0133 |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0241927 A1 | 7/2020 | Yang et al. |
| 2020/0244721 A1 | 7/2020 | S et al. |
| 2020/0245210 A1* | 7/2020 | Fotheringham ......... H04L 47/22 |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0267203 A1 | 8/2020 | Jindal et al. |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0301764 A1 | 9/2020 | Thoresen et al. |
| 2020/0314006 A1 | 10/2020 | Mackie et al. |
| 2020/0314614 A1 | 10/2020 | Moustafa et al. |

(56) References Cited

U.S. PATENT DOCUMENTS

| | | |
|---|---|---|
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344089 A1 | 10/2020 | Motwani et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0389796 A1 | 12/2020 | Olofsson et al. |
| 2020/0403821 A1 | 12/2020 | Dev et al. |
| 2020/0412483 A1 | 12/2020 | Tan et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0021538 A1 | 1/2021 | Meck et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0037159 A1 | 2/2021 | Shimokawa |
| 2021/0049191 A1 | 2/2021 | Masson et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0073001 A1 | 3/2021 | Rogers et al. |
| 2021/0092062 A1 | 3/2021 | Dhanabalan et al. |
| 2021/0099360 A1 | 4/2021 | Parsons et al. |
| 2021/0105199 A1 | 4/2021 | H et al. |
| 2021/0111998 A1 | 4/2021 | Saavedra |
| 2021/0112034 A1* | 4/2021 | Sundararajan ........ H04L 47/125 |
| 2021/0126830 A1 | 4/2021 | R. et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0168125 A1* | 6/2021 | Vemulpali ............ H04L 9/3236 |
| 2021/0176255 A1 | 6/2021 | Hill et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0314385 A1 | 10/2021 | Pande et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0392171 A1 | 12/2021 | Srinivas et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0400512 A1 | 12/2021 | Agarwal et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0029902 A1 | 1/2022 | Shemer et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0045927 A1 | 2/2022 | Liu et al. |
| 2022/0052928 A1 | 2/2022 | Sundararajan et al. |
| 2022/0061059 A1 | 2/2022 | Dunsmore et al. |
| 2022/0086035 A1 | 3/2022 | Devaraj et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |
| 2022/0131898 A1* | 4/2022 | Hooda ................ H04L 47/746 |
| 2022/0141184 A1 | 5/2022 | Oswal et al. |
| 2022/0158923 A1 | 5/2022 | Ramaswamy et al. |
| 2022/0158924 A1 | 5/2022 | Ramaswamy et al. |
| 2022/0158926 A1 | 5/2022 | Wennerstrom et al. |
| 2022/0166713 A1 | 5/2022 | Markuze et al. |
| 2022/0191719 A1 | 6/2022 | Roy |
| 2022/0198229 A1 | 6/2022 | López et al. |
| 2022/0210035 A1 | 6/2022 | Hendrickson et al. |
| 2022/0210041 A1 | 6/2022 | Gandhi et al. |
| 2022/0210042 A1 | 6/2022 | Gandhi et al. |
| 2022/0210122 A1 | 6/2022 | Levin et al. |
| 2022/0217015 A1 | 7/2022 | Vuggrala et al. |
| 2022/0231949 A1 | 7/2022 | Ramaswamy et al. |
| 2022/0231950 A1 | 7/2022 | Ramaswamy et al. |
| 2022/0232411 A1 | 7/2022 | Vijayakumar et al. |
| 2022/0239596 A1 | 7/2022 | Kumar et al. |
| 2022/0294701 A1 | 9/2022 | Mayya et al. |
| 2022/0335027 A1 | 10/2022 | Seshadri et al. |
| 2022/0337553 A1 | 10/2022 | Mayya et al. |
| 2022/0345985 A1* | 10/2022 | Erta ...................... H04L 45/50 |
| 2022/0353152 A1 | 11/2022 | Ramaswamy |
| 2022/0353171 A1 | 11/2022 | Ramaswamy et al. |
| 2022/0353175 A1 | 11/2022 | Ramaswamy et al. |
| 2022/0353182 A1 | 11/2022 | Ramaswamy et al. |
| 2022/0353190 A1 | 11/2022 | Ramaswamy et al. |
| 2022/0360500 A1 | 11/2022 | Ramaswamy et al. |
| 2022/0386217 A1* | 12/2022 | Rondeau .............. H04W 40/00 |
| 2022/0407773 A1 | 12/2022 | Kempanna et al. |
| 2022/0407774 A1 | 12/2022 | Kempanna et al. |
| 2022/0407790 A1 | 12/2022 | Kempanna et al. |
| 2022/0407820 A1 | 12/2022 | Kempanna et al. |
| 2022/0407915 A1 | 12/2022 | Kempanna et al. |
| 2022/0410728 A1* | 12/2022 | Marquez .......... H01M 8/04313 |
| 2023/0006929 A1 | 1/2023 | Mayya et al. |
| 2023/0025586 A1 | 1/2023 | Rolando et al. |
| 2023/0026330 A1 | 1/2023 | Rolando et al. |
| 2023/0026865 A1 | 1/2023 | Rolando et al. |
| 2023/0028872 A1 | 1/2023 | Ramaswamy |
| 2023/0039869 A1 | 2/2023 | Ramaswamy et al. |
| 2023/0041916 A1 | 2/2023 | Zhang et al. |
| 2023/0054961 A1 | 2/2023 | Ramaswamy et al. |
| 2023/0069236 A1* | 3/2023 | Kozin ................. G01S 5/02213 |
| 2023/0105680 A1 | 4/2023 | Simlai et al. |
| 2023/0121871 A1 | 4/2023 | Mayya et al. |
| 2023/0164158 A1 | 5/2023 | Fellows et al. |
| 2023/0179445 A1 | 6/2023 | Cidon et al. |
| 2023/0179502 A1 | 6/2023 | Ramaswamy et al. |
| 2023/0179521 A1 | 6/2023 | Markuze et al. |
| 2023/0179543 A1 | 6/2023 | Cidon et al. |
| 2023/0216768 A1 | 7/2023 | Zohar et al. |
| 2023/0216801 A1 | 7/2023 | Markuze et al. |
| 2023/0216804 A1 | 7/2023 | Zohar et al. |
| 2023/0221874 A1 | 7/2023 | Markuze et al. |
| 2023/0224356 A1 | 7/2023 | Markuze et al. |
| 2023/0224759 A1 | 7/2023 | Ramaswamy |
| 2023/0231845 A1 | 7/2023 | Manoharan et al. |
| 2023/0239234 A1 | 7/2023 | Zohar et al. |
| 2023/0261974 A1 | 8/2023 | Ramaswamy et al. |

(56) References Cited

U.S. PATENT DOCUMENTS

| | | | |
|---|---|---|---|
| 2023/0308421 | A1 | 9/2023 | Mayya et al. |
| 2023/0344921 | A1* | 10/2023 | Duraisamy ......... H04L 63/0272 |
| 2024/0031288 | A1* | 1/2024 | Ponnuru ............ H04L 45/7453 |
| 2024/0340243 | A1* | 10/2024 | Ababri .................... H04L 47/20 |
| 2025/0119454 | A1* | 4/2025 | Sanders ............. H04L 41/0806 |

FOREIGN PATENT DOCUMENTS

| | | | | |
|---|---|---|---|---|
| CN | 102577270 | A | | 7/2012 |
| CN | 102811165 | A | | 12/2012 |
| CN | 104205757 | A | | 12/2014 |
| CN | 104956329 | A | | 9/2015 |
| CN | 106656847 | A | | 5/2017 |
| CN | 106998284 | A | | 8/2017 |
| CN | 110447209 | A | | 11/2019 |
| CN | 111198764 | A | | 5/2020 |
| CN | 111557109 | A | * 8/2020 | ............. H04L 45/64 |
| CN | 114467286 | A | * 5/2022 | .......... H04W 40/248 |
| EP | 1031224 | B1 | | 3/2005 |
| EP | 1912381 | A1 | | 4/2008 |
| EP | 2538637 | A2 | | 12/2012 |
| EP | 2763362 | A1 | | 8/2014 |
| EP | 3041178 | A1 | | 7/2016 |
| EP | 3297211 | A1 | | 3/2018 |
| EP | 3509256 | A1 | | 7/2019 |
| EP | 3346650 | B1 | | 11/2019 |
| IN | 106230650 | A | | 12/2016 |
| JP | 2002368792 | A | | 12/2002 |
| JP | 2010233126 | A | | 10/2010 |
| JP | 2014200010 | A | | 10/2014 |
| JP | 2017059991 | A | | 3/2017 |
| JP | 2017524290 | A | | 8/2017 |
| KR | 20170058201 | A | | 5/2017 |
| NO | 2012167184 | A2 | | 12/2012 |
| RU | 2574350 | C2 | | 2/2016 |
| WO | 2000078004 | A2 | | 12/2000 |
| WO | 03073701 | A1 | | 9/2003 |
| WO | 2005071861 | A1 | | 8/2005 |
| WO | 2007016834 | A1 | | 2/2007 |
| WO | 2015092565 | A1 | | 6/2015 |
| WO | 2016061546 | A1 | | 4/2016 |
| WO | 2016123314 | A1 | | 8/2016 |
| WO | 2017083975 | A1 | | 5/2017 |
| WO | 2019070611 | A1 | | 4/2019 |
| WO | 2019094522 | A1 | | 5/2019 |
| WO | 2020012491 | A1 | | 1/2020 |
| WO | 2020018704 | A1 | | 1/2020 |
| WO | 2020091777 | A1 | | 5/2020 |
| WO | 2020101922 | A1 | | 5/2020 |
| WO | 2020112345 | A1 | | 6/2020 |
| WO | 2021040934 | A1 | | 3/2021 |
| WO | 2021118717 | A1 | | 6/2021 |
| WO | 2021150465 | A1 | | 7/2021 |
| WO | 2021211906 | A1 | | 10/2021 |
| WO | 2022005607 | A1 | | 1/2022 |
| WO | 2022082680 | A1 | | 4/2022 |
| WO | 2022154850 | A1 | | 7/2022 |
| WO | 2022159156 | A1 | | 7/2022 |
| WO | 2022231668 | A1 | | 11/2022 |
| WO | 2022235303 | A1 | | 11/2022 |
| WO | 2022265681 | A1 | | 12/2022 |
| WO | 2023009159 | | | 2/2023 |

OTHER PUBLICATIONS

Non-Published Commonly Owned U.S. Appl. No. 18/222,868, filed Jul. 17, 2023, 22 pages, VMware, Inc.

Non-Published Commonly Owned U.S. Appl. No. 18/224,466, filed Jul. 20, 2023, 56 pages, VMware, Inc.

Non-Published Commonly Owned U.S. Appl. No. 18/235,879, filed Aug. 20, 2023, 173 pages, VMware, Inc.

Non-Final Office Action mailed Apr. 17, 2025 in U.S. Appl. No. 18/100,381, 25 pages.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Author Unknown, "VeloCloud Administration Guide: VMware SD-WAN by VeloCloud 3.3," Month Unknown 2019, 366 pages, VMware, Inc., Palo Alto, CA, USA.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Guo, Xiangyi, et al., (U.S. Appl. No. 62/925,193), filed Oct. 23, 2019, 26 pages.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Lasserre, Marc, et al., "Framework for Data Center (DC) Network Virtualization," RFC 7365, Oct. 2014, 26 pages, IETF.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Lin, Weidong, et al., "Using Path Label Routing in Wide Area Software-Defined Networks with Open Flow," 2016 International Conference on Networking and Network Applications, Jul. 2016, 6 pages, IEEE.

(56) References Cited

OTHER PUBLICATIONS

Long, Feng, "Research and Application of Cloud Storage Technology in University Information Service," Chinese Excellent Masters' Theses Full-text Database, Mar. 2013, 72 pages, China Academic Journals Electronic Publishing House, China.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 17/574,225, filed Jan. 12, 2022, 56 pages, VMware, Inc.

Non-Published Commonly Owned U.S. Appl. No. 17/574,236, filed Jan. 12, 2022, 54 pages, VMware, Inc.

Non-Published Commonly Owned U.S. Appl. No. 17/695,264, filed Mar. 15, 2022, 28 pages, VMware, Inc.

Non-Published Commonly Owned U.S. Appl. No. 17/833,555, filed Jun. 6, 2022, 34 pages, VMware, Inc.

Non-Published Commonly Owned U.S. Appl. No. 17/833,566, filed Jun. 6, 2022, 35 pages, VMware, Inc.

Non-Published Commonly Owned U.S. Appl. No. 17/966,814, filed Oct. 15, 2022, 176 pages, VMware, Inc.

Non-Published Commonly Owned U.S. Appl. No. 17/966,820, filed Oct. 15, 2022, 26 pages, VMware, Inc.

Non-Published Commonly Owned U.S. Appl. No. 17/976,717, filed Oct. 28, 2022, 37 pages, VMware, Inc.

Non-Published Commonly Owned U.S. Appl. No. 18/083,536, filed Dec. 18, 2022, 27 pages, VMware, Inc.

Non-Published Commonly Owned U.S. Appl. No. 18/088,554, filed Dec. 24, 2022, 34 pages, VMware, Inc.

Non-Published Commonly Owned U.S. Appl. No. 18/088,555, filed Dec. 24, 2022, 35 pages, VMware, Inc.

Non-Published Commonly Owned U.S. Appl. No. 18/088,556, filed Dec. 24, 2022, 27 pages, VMware, Inc.

Non-Published Commonly Owned U.S. Appl. No. 18/096,001, filed Jan. 11, 2023, 34 pages, VMware, Inc.

Non-Published Commonly Owned Related U.S. Appl. No. 18/100,381 with similar specification, filed Jan. 23, 2023, 55 pages, VMware, Inc.

Non-Published Commonly Owned Related U.S. Appl. No. 18/100,397 with similar specification, filed Jan. 23, 2023, 55 pages, VMware, Inc.

Non-Published Commonly Owned U.S. Appl. No. 18/102,685, filed Jan. 28, 2023, 124 pages, VMware, Inc.

Non-Published Commonly Owned U.S. Appl. No. 18/102,687, filed Jan. 28, 2023, 172 pages, VMware, Inc.

Non-Published Commonly Owned U.S. Appl. No. 18/102,688, filed Jan. 28, 2023, 49 pages. VMware, Inc.

Non-Published Commonly Owned U.S. Appl. No. 18/102,689, filed Jan. 28, 2023, 46 pages, VMware, Inc.

Non-Published Commonly Owned U.S. Appl. No. 15/803,964, filed Nov. 6, 2017, 15 pages, The Mode Group.

Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.

Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php?process=download&id=127&code=89d30565cd2ce087d3f8e95f9ad683066510a61f.

Tootaghaj, Diman Zad, et al., "Homa: An Efficient Topology and Route Management Approach in SD-WAN Overlays," IEEE INFOCOM 2020—IEEE Conference on Computer Communications, Jul. 6-9, 2020, 10 pages, IEEE, Toronto, ON, Canada.

Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.

Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.

Non-Published Commonly Owned U.S. Appl. No. 18/137,584, filed Apr. 21, 2023, 57 pages, VMware, Inc.

Non-Published Commonly Owned U.S. Appl. No. 18/197,090, filed May 14, 2023, 36 pages, Nicira, Inc.

Non-Published Commonly Owned U.S. Appl. No. 18/211,568, filed Jun. 19, 2023, 37 pages, VMware, Inc.

\* cited by examiner

DYNAMIC USE OF MULTIPLE WIRELESS NETWORK LINKS TO CONNECT A VEHICLE TO AN SD-WAN

BACKGROUND

There have been many solutions proposed to date for tracking vehicles through wireless networks. There has also been many products and services to date for allowing devices on a vehicle to connect to computer networks. However, to date, there has not been solutions proposed to date to connect a vehicle to Software Defined Wide Area Networks (SD-WAN) or to use multiple different network links on a vehicle.

BRIEF SUMMARY

Some embodiments provide a novel method for connecting a vehicle to a software defined wide area network (SD-WAN). The method deploys an edge router to operate on the vehicle, and configures the edge router to connect to several wireless physical network links (e.g., telecommunication network links, such as 5G links) operating in the vehicle. In some embodiments, the different wireless network links are different mobile hotspot links provided by different telecommunication network providers (e.g., AT&T, Verizon, T-Mobile, Orange, etc.). The method configures the edge router to forward several data message flows from a device operating in the vehicle (e.g., a computer located in the vehicle or a machine (e.g., virtual machine, Pod, container, etc.) executing on a computer located in the vehicle) to the SD-WAN using the several wireless network links.

The edge router of some embodiments is one of an edge router appliance, an edge router executing on a computer that operates in the vehicle, or an edge router executing on a machine that executes on the computer. This machine may be one of a VM, a Pod, or a container.

In some embodiments, the method's configuration of the edge router to forward data message flows includes configuring the edge router to forward data messages of each of one or more particular flows along different wireless network links. Different wireless network links in some embodiments provide different transmission rates, different levels of reliability, etc., and the method configures the edge router to forward data message flows along different wireless network links such that the data message flows are forwarded in an optimal configuration.

In some embodiments, the method's configuration of the edge router to forward data message flows includes configuring the edge router to iteratively collect metrics quantifying a set of attributes of each wireless network link at different locations traveled by the vehicle, and select different wireless network links for forwarding data messages at the different locations based on the collected metrics. As the vehicle moves throughout different locations, wireless network links will strengthen or weaken, and the edge router collects metrics for the wireless network links at various different locations to determine the optimal wireless network links at the various locations, such that the edge router can forward data messages using the optimal wireless network links when the vehicle is at each location.

The method's configuration of the edge router to forward data message flows in some embodiments includes configuring the edge router to iteratively collect metrics quantifying a set of attributes of each wireless network link at different times, and select different wireless network links for forwarding data messages at different times based on the collected metrics. In some embodiments, a wireless network link may be optimal at one time of day, and not optimal at another time of day. The edge router collects metrics to determine at which times the wireless network links are optimal in order to use the optimal wireless network link or links throughout the day.

As discussed previously, different wireless network links in some embodiments provide different transmission rates, different levels of reliability, etc. In some embodiments, the set of attributes of the wireless network links quantified by the collected metrics include attributes associated with at least one of reliability and speed of the wireless network link. Different wireless network links provide differing reliability and transmission rates for data messages, and the reliability and speed of the links can change based on the vehicle's location, the time of day, and other various factors. The set of attributes for each link, therefore, may include attributes relating to the link's reliability and speed, and the edge router may forward data messages along different wireless network links based on their reliability and speed.

In some embodiments, the method's configuration of the edge router to forward data message flows includes configuring the edge router to embed the data messages with a sequence number for a destination router of the SD-WAN that receives the data messages. In different embodiments, the destination router may be a gateway of the SD-WAN, a hub forwarding node of a datacenter of the SD-WAN, or an edge forwarding node of a branch site of the SD-WAN. Because the data messages can be sent along different wireless network links, the data messages may not be received at the destination router in the same order in which they were sent. The destination router may then use the sequence numbers embedded in the data messages to put the data messages in their correct sequential order before forwarding the data messages to a subsequent destination in the SD-WAN. This ensures that data messages are optimally sent to the destination router by being sent along different wireless network links, and that the data messages are sent in the correct order to their subsequent destination.

The method of some embodiments includes configuring a deep packet inspector to perform a deep packet inspection (DPI) on a particular flow to identify a type of traffic carried by data messages of the particular flow. The method also configures the edge router to select, based on the identified traffic type, a particular wireless network link from the several wireless network links to forward the particular flow. The type of traffic may be a critical type of traffic that requires a highly reliable wireless network link, a type of traffic that requires a fast wireless network link, or some other type of traffic that only a particular wireless network link can forward such that it satisfies the requirement(s) of that type of traffic.

In some embodiments, configuring the edge router to select the particular wireless network link based on the identified traffic type includes providing the edge router with a set of rules that specify different desired link attributes for different types of traffic. This set of rules in some embodiments includes a rule specifying selecting a wireless network link with a highest reliability score for a particular type of traffic. For a critical type of traffic, the most reliable wireless network link should be used. When forwarding a flow of this traffic type, the edge router may compute reliability scores for each of the wireless network links (e.g., using collected metrics quantifying attributes of the links) and, using the rule, select the link with the highest reliability score to use to forward the critical flow. In some embodiments, the link with the highest reliability score does not have the highest transmission rate score, meaning that the most reliable link is not the fastest. In such embodiments, while the critical flow is not sent along the fast link, the critical flow is sent along the most reliable link, as specified by the rule in the rule set.

The set of rules in some embodiments includes a rule specifying selecting a wireless network link with a prerequisite reliability score for a particular type of traffic. In some embodiments, critical flows specify a required reliability score for the link on which it is forwarded. In such embodiments, two or more wireless links may have prerequisite reliability scores that satisfy the score required by the flow, and the edge router may select the wireless network link that satisfies the required reliability score but is not the most reliable link.

In some embodiments, the set of rules includes a rule that specifies selecting a wireless network link with a lowest transmission time score for a particular type of traffic. As discussed previously, a particular type of traffic may require being sent along the fastest wireless network link. When forwarding a flow of this traffic type, the edge router may compute transmission time scores for each of the wireless network links (e.g., using collected metrics quantifying attributes of the links) and, using the rule, select the link with the lowest transmission time score (equating to the fastest link) to use to forward the flow.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for connecting one or more vehicles to a software defined wide area network (SD-WAN). The method deploys an edge router to operate in the vehicle, and configures the edge router to connect to several wireless network links (e.g., wireless layer 1 physical network links) operating in the vehicle. In the embodiments described below, the different wireless network links are different mobile hotspot links (e.g., 5G cellular links) provided by different telecommunication network providers (e.g., AT&T, Verizon, T-Mobile, Orange, etc.). However, other embodiments use other types of wireless network links. The method configures the edge router to forward several data message flows from a device operating in the vehicle (e.g., a computer located in the vehicle or a machine (e.g., virtual machine, Pod, container, etc.) executing on a computer located in the vehicle) to the SD-WAN using the several telecommunications network links.

Figure 1:
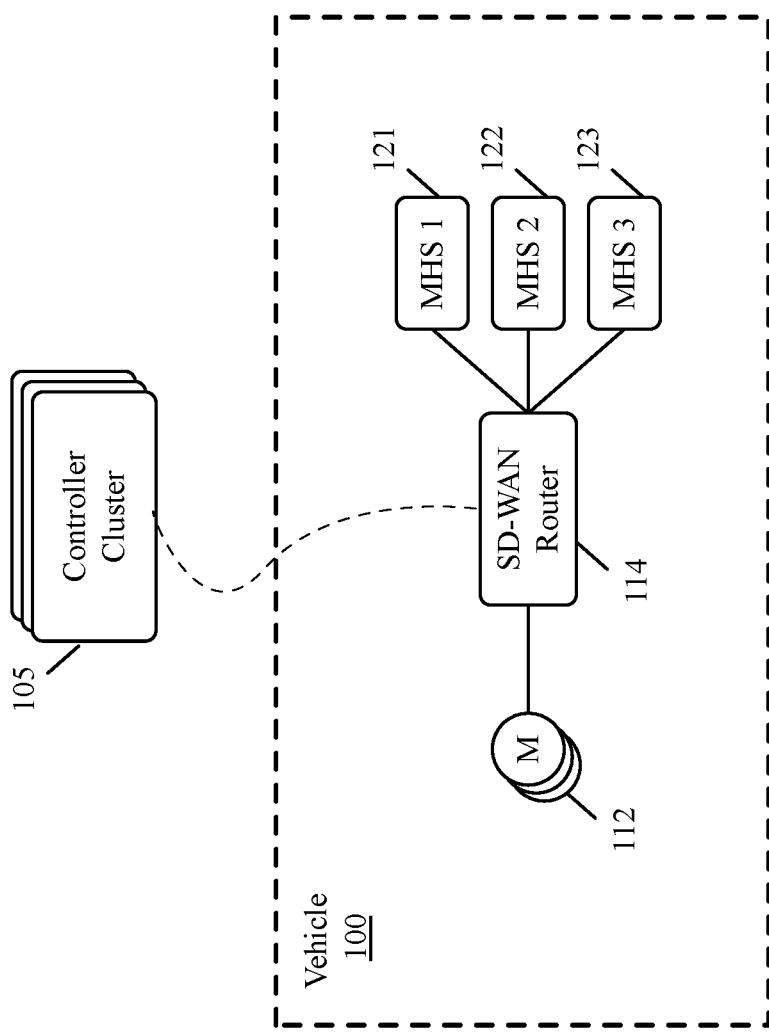
FIG. 1 illustrates an example vehicle and controller cluster for which some embodiments of the invention are implemented.

FIG. 1 illustrates an example of a vehicle 100 and a controller cluster 105 that implement the method of some embodiments of the invention. As shown, the vehicle 100 includes a set of one or more compute machines 112, an SD-WAN router 114 and several network links 121-123. The controller cluster 105 serves as a central point for managing (e.g., defining and modifying) configuration data that is provided to the components of the vehicle 100 to configure some or all of the operations. In some embodiments, this controller cluster 105 is in one or more public cloud datacenters, while in other embodiments it is in one or more private datacenters. In some embodiments, the controller cluster 105 has a set of manager servers that define and modify the configuration data, and a set of controller servers that distribute the configuration data to the vehicle 100. In some embodiments, the controller cluster 105 directs the SD-WAN router 114 of the vehicle 100 to use certain gateways (i.e., assigns a gateway to the SD-WAN router 114).

The SD-WAN router 114 of some embodiments is one of an edge router appliance, an edge router executing on a computer that operates in the vehicle 100, or an edge router executing on a machine that executes on the computer. This machine may be one of a VM, a Pod, or a container. In some embodiments, the controller cluster 105 configures the SD-WAN router 114 to forward different data message flows (or data messages of a flow) along different telecommunication network links 121-123. The network links 121-123 are in some embodiments different mobile hotspot links provided by different telecommunication network providers (e.g., AT&T, Verizon, T-Mobile, Orange, etc.). These network links 121-123 connect the vehicle 100 to an SD-WAN.

The controller cluster 105 of some embodiments configures the SD-WAN router 114 to forward data messages along different network links 121-123 such that the data messages are forwarded in an optimal configuration. In some embodiments, different wireless network links provide different transmission rates, different amounts of reliability, etc. In such embodiments, the controller 105 provides the SD-WAN router 114 with link selection rules for selecting links for forwarding data message flows. In other embodiments, the controller cluster 105 configures the SD-WAN router 114 to iteratively (1) collect metrics quantifying a set of attributes of each network link 1210123, and (2) select different network links 121-123 for forwarding data messages based on the collected metrics. These sets of attributes of the network links 121-123 quantified by the collected metrics may include attributes associated with at least one of reliability and speed of the network link 121-123. The network links 121-123 provide different levels reliability and transmission rates for data messages, and the reliability and speed of these links 121-123 can change based on the vehicle 100's location, the time of day, and other various factors. The set of attributes for each link 121-123, therefore, may include attributes relating to the link's reliability and speed, and the SD-WAN router 114 may forward data messages along the different network links 121-123 based on their reliability and speed. Any suitable performance or non-performance metrics associated with network links may be used to determine optimal links.

The controller cluster 105 of some embodiments configures the SD-WAN router 114 to iteratively (1) collect metrics quantifying a set of attributes of each network link 1210123 at different locations traveled by the vehicle 100, and (2) select different network links 121-123 for forwarding data messages at the different locations based on the collected metrics. As the vehicle 100 moves throughout different locations, the network links 121-123 will strengthen or weaken as the vehicle 100 moves closer to and farther away from different cellular towers. The SD-WAN router 114 may collect metrics for the network links 121-123 at various different locations to determine which links are optimal at the various locations, such that the SD-WAN router 114 can forward data messages using the optimal wireless network links when the vehicle is at each location. For instance, the SD-WAN router may use metrics for the network links 121-123 to determine that network link 121 is the optimal link at a first location, while network link 122 is the optimal link at a second location. Based on this determination, the SD-WAN router 114 forwards data messages using the first network link 121 when the vehicle 100 is at the first location, and forwards data messages using the second network link 122 when the vehicle 100 is at the second location. This ensures that data messages are forwarded using the optimal link, no matter the location of the vehicle 100.

The controller cluster 105 may also configure the SD-WAN router 114 to iteratively (1) collect metrics quantifying a set of attributes of each network link 121-123 at different times, and (2) select different network links for forwarding data messages at different times based on the collected metrics. In some embodiments, a network link may be optimal at one time of day, and not optimal at another time of day. In order to ensure that the optimal link is used, the SD-WAN router 114 uses the collected metrics to determine which network link 121-123 is optimal at each time of the day, and uses the optimal link at any given time throughout the day for forwarding data messages.

Figure 2:
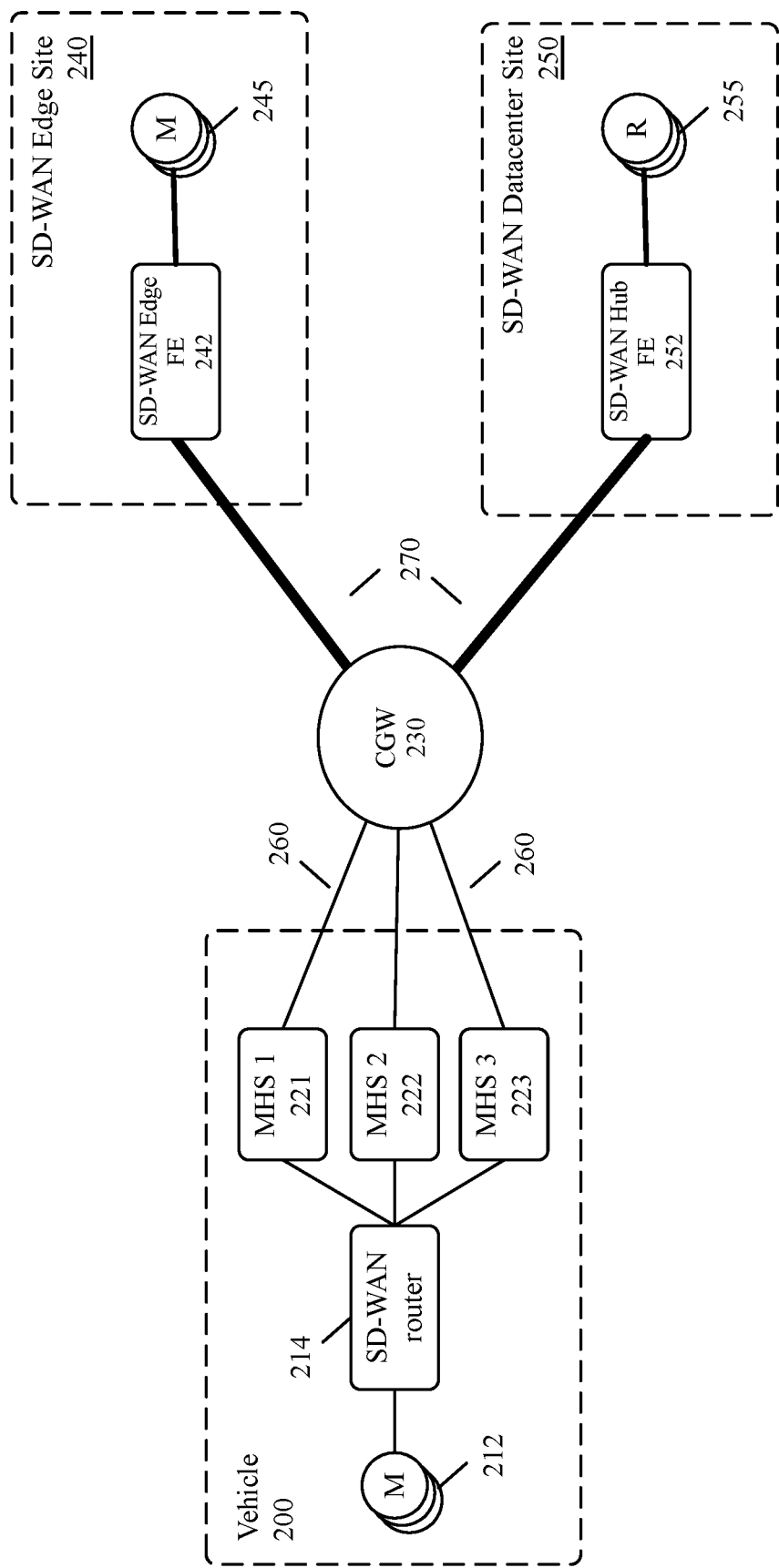
FIGS. 2 and 3 illustrate an example vehicle that communicates with various components of an SD-WAN.
Figure 3:
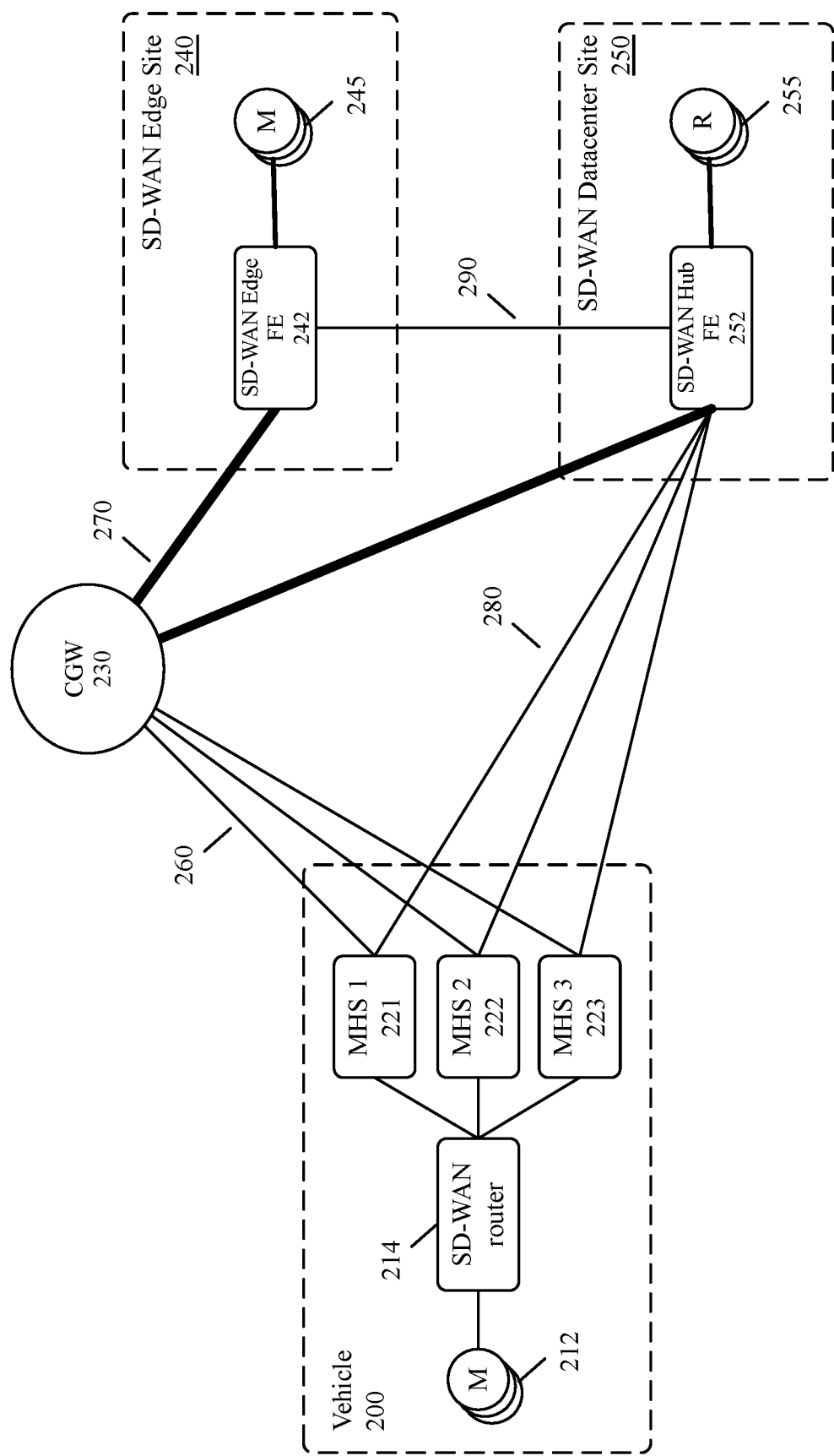

As discussed previously, an SD-WAN router of a vehicle uses the various network links to connect to an SD-WAN. FIGS. 2 and 3 illustrate an example vehicle 200 that communicates with various components of an SD-WAN, i.e., a cloud gateway (CGW) 230, an SD-WAN edge site 240, and an SD-WAN datacenter site 250. The vehicle 200 includes one or more compute machines 212, an SD-WAN router 214, and network links 221-223 for forwarding data messages to the various components of the SD-WAN. The edge site 240 is a branch site (e.g., of an entity that owns the vehicle 200 or is associated with the owner of this vehicle) that includes an SD-WAN forwarding element (FE) 242 and a set of one or more machines 245. The datacenter site 250 includes a hub forwarding node 252 and a set of one or more resources 255 which may be used by the edge site 240 or the vehicle 200. The datacenter SD-WAN forwarding node 252 is referred to as a hub node because in some embodiments this forwarding node can be used to connect to other edge forwarding nodes of the branch site 240 and of the vehicle 200. The hub node in some embodiments provides services (e.g., middlebox services) for packets that it forwards between a vehicle and a branch site. The hub node also provides access to the datacenter resources 255.

In FIG. 2, the network links 221-223 of the vehicle 200 are shown to connect to the CGW 230 through connection links 260. In some embodiments, these connection links include secure and unsecure connection links, while in other embodiments they only include secure connection links. Multiple secure connection links (e.g., multiple secure tunnels that are established over multiple physical links) can be established between two components (e.g., a vehicle and a gateway, or an edge node and a gateway) in some embodiments.

The CGW 230 connects to the edge site 240 and the datacenter site 250 through secure connection links 270 that connect to the edge FE 242 of the edge site 240 and the hub FE 252 of the datacenter site 250. These connection links 270 are shown as bolded lines to represent the three telecommunication providers that provide the three network links 221-223 for the vehicle 200. In some embodiments, the edge site 240 and datacenter site 250 each include three separate forwarding elements for receiving communications with the vehicle 200 along the different network links 221-223. In other embodiments, only one forwarding element on each site communicates with the vehicle 200.

In some embodiments, the vehicle 200 connects directly to the edge site 240 and the datacenter site 250, without communicating through the CGW 230. FIG. 3 illustrates the same vehicle 200, CGW 230, edge site 240, and datacenter site 250, with secure connection links 280 connecting the network links 221-223 directly to the hub FE 252 of the datacenter site 250. Using these links 280, the vehicle 200 is able to access the edge site 240 and the datacenter site 250 without communicating through the gateway 230. This figure also illustrates a secure connection link 290 between the edge site 240 and the datacenter site 250. In some embodiments, the vehicle 200 accesses the edge site 240 through the datacenter site 250.

The hub FE 252 of the datacenter site 250 acts as a hub in order for the vehicle 200 to communicate with the edge FE 242 through the datacenter site 250. More specifically, in some embodiments, the hub 252 serves as the hub node of the SD-WAN in that it allows programs executing at an SD-WAN node (e.g., programs executing on the machines 212 operating in the vehicle) access to the datacenter resources 255 as well as access to the machines at the SD-WAN nodes (e.g., access to the machines 245 at the edge site 242). When providing access to another edge site's machines through that edge site's forwarding router (e.g., to machines 245 through the edge forwarding router 242), the hub serves as the hub node of an SD-WAN that is implemented in a hub-and-spoke architecture. In some embodiments, the SD-WAN performs middlebox services (e.g., firewall services, load balancing services, NAT services, etc.) to the SD-WAN traffic that passes through the hub. Lastly, in some embodiments, the cloud gateway 230 can direct the vehicle 200 to directly connect to the edge site 240 without passing its data messages first through the cloud gateway or the datacenter hub 252.

Figure 4:
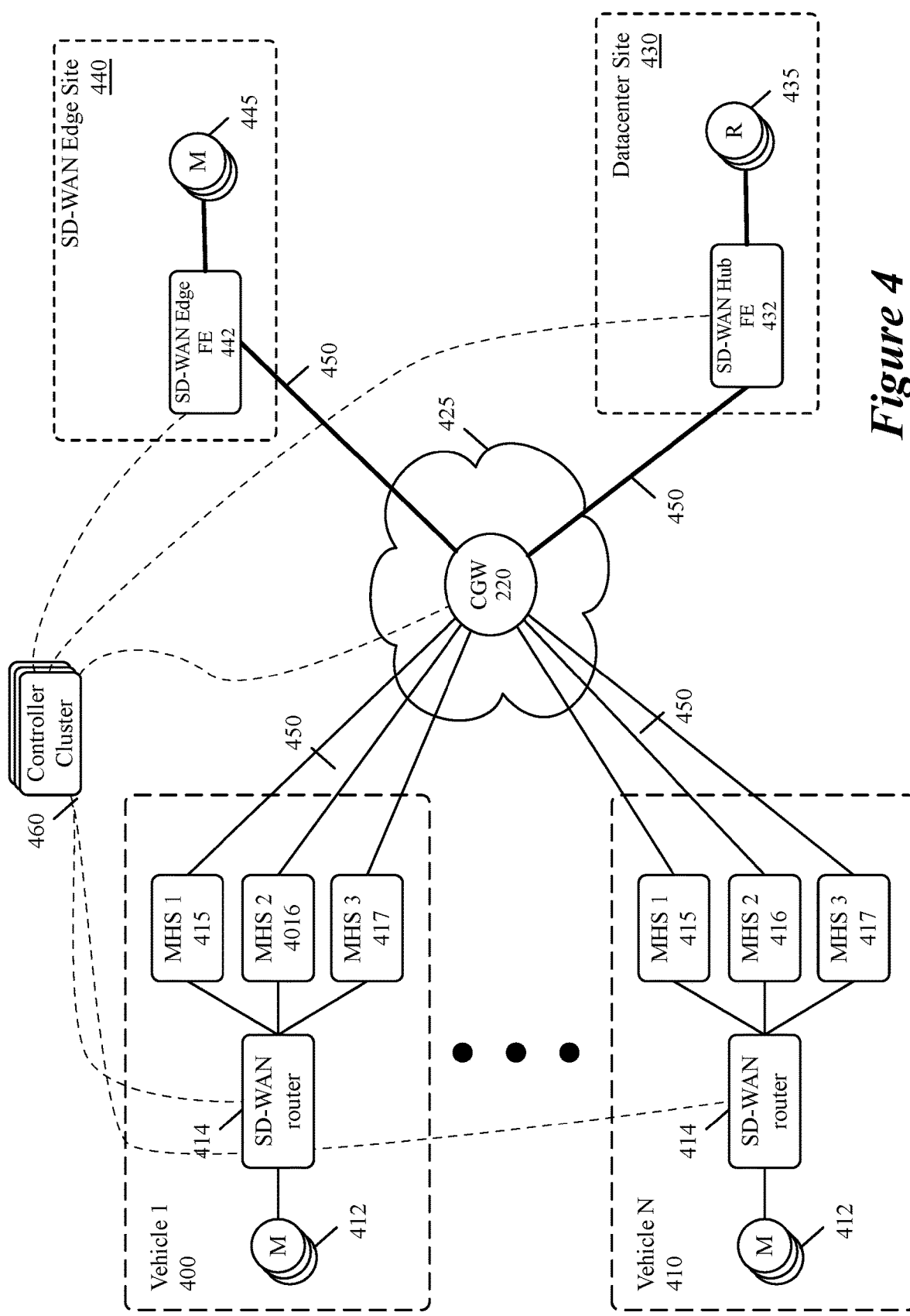
FIG. 4 illustrates an example of N vehicles that communicate with various components of an SD-WAN.

FIG. 4 illustrates an example of vehicles 400 and 410 that communicate with various components of an SD-WAN. Any number of vehicles 1-N may be used. The vehicles 400 and 410 respectively include sets of one or more compute machines 412, SD-WAN routers 414, and network links 415-417. The SD-WAN includes a cloud gateway 420, a datacenter site 430, and a branch site 440.

The CGW in some embodiments is a forwarding element that is in a private or public datacenter 425. The CGW 420 in some embodiments has secure connection links (e.g., tunnels) with edge forwarding elements (e.g., SD-WAN edge FE 442) at multi-machine sites (e.g., SD-WAN edge site 440 with multiple machines 445), such as branch offices, datacenters, etc. These multi-machine sites are often at different physical locations (e.g., different buildings, different cities, different states, etc.) and are referred to below as multi-machine sites or nodes. Two multi-machine sites 430 and 440 are illustrated in FIG. 4, with one of them being a branch site 440, and one being a datacenter site 430. The branch site is shown to include an edge forwarding node 442, while the datacenter site 430 is shown to include a hub forwarding node 432. The edge forwarding element (e.g., SD-WAN edge FE 442) exchanges data messages with one or more cloud gateways 420 through one or more connection links 450 (e.g., multiple connection links available at the edge forwarding element).

When multiple such links are defined between an edge node and a gateway, each secure connection link in some embodiments is associated with a different physical network link between the edge node and an external network. For instance, to access external networks, an edge node in some embodiments has one or more commercial broadband Internet links (e.g., a cable modem, a fiber optic link) to access the Internet, an MPLS (multiprotocol label switching) link to access external networks through an MPLS provider's network, a wireless cellular link (e.g., a 5G LTE network).

In some embodiments, the different physical links between the edge node 442 and the cloud gateway 420 are the same type of links (e.g., are different MPLS links).

In some embodiments, the edge forwarding node 442 can also have multiple direct links 450 (e.g., secure connection links established through multiple physical links) to a datacenter hub node 432. Again, the different links in some embodiments can use different types of physical links or the same type of physical links. Also, in some embodiments, the edge forwarding node 442 of the branch site can connect to a SD-WAN router of a vehicle (1) directly through one or more links 450, or (2) through a cloud gateway or datacenter hub to which the edge forwarding node connects through two or more links 450. Hence, in some embodiments, the edge forwarding node 442 of the branch site 440 can use multiple SD-WAN links 450 to reach an SD-WAN router (e.g., 204) of a vehicle (e.g., 400), or a hub forwarding node 432 of a datacenter site 430.

The cloud gateway 420 in some embodiments is used to connect an SD-WAN router of a vehicle (e.g., SD-WAN router 414 of vehicle 410) to an SD-WAN forwarding node (e.g., edge forwarding element 442) through at least two secure connection links 450 between the gateway 420 and the SD-WAN router and between the gateway 420 and the forwarding element at the SD-WAN site (e.g., branch site 440 or datacenter site 430). In some embodiments, the cloud gateway 420 also provides network data from a vehicle to a multi-machine site or from one multi-machine site to another multi-machine site (e.g., provides the accessible subnets of one site to another site). Like the cloud gateway 420, the hub forwarding element 432 of the datacenter 430 in some embodiments can be used to connect an SD-WAN forwarding node 442 of a branch site to an SD-WAN router of a vehicle through at least two secure connection links 450 between the hub 432 and the SD-WAN router and between the hub 432 and the forwarding element at the branch site 440.

In some embodiments, each secure connection link between two SD-WAN forwarding nodes (i.e., CGW 420 and edge forwarding node 442) is formed as a VPN (virtual private network) tunnel between the two forwarding nodes. In this example, the collection of the SD-WAN forwarding nodes (e.g., forwarding element 442 and gateways 420) and the secure connections 450 between the forwarding nodes forms a virtual network for a particular entity that spans at least public or private cloud datacenter 425 to connect the branch and datacenter sites 430 and 440.

In some embodiments, secure connection links are defined between gateways in different public cloud datacenters to allow paths through the virtual network to traverse from one public cloud datacenter to another, while no such links are defined in other embodiments. Also, in some embodiments, the gateway 420 is a multi-tenant gateway that is used to define other virtual networks for other entities (e.g., other companies, organizations, etc.). Some such embodiments use tenant identifiers to create tunnels between a gateway and edge forwarding element of a particular entity, and then use tunnel identifiers of the created tunnels to allow the gateway to differentiate data message flows that it receives from edge forwarding elements of one entity from data message flows that it receives along other tunnels of other entities. In other embodiments, gateways are single-tenant and are specifically deployed to be used by just one entity.

FIG. 4 illustrates a cluster of controllers 460 that serves as a central point for managing (e.g., defining and modifying) configuration data that is provided to the edge nodes and/or gateways to configure some or all of the operations. In some embodiments, this controller cluster 460 is in one or more public cloud datacenters, while in other embodiments it is in one or more private datacenters. In some embodiments, the controller cluster 460 has a set of manager servers that define and modify the configuration data, and a set of controller servers that distribute the configuration data to the edge FEs, hubs and/or gateways. In some embodiments, the controller cluster 460 directs edge forwarding elements and hubs to use certain gateways (i.e., assigns a gateway to the edge forwarding elements and hubs). The controller cluster 460 also provides next hop forwarding rules and load balancing criteria in some embodiments.

To connect the vehicles 400 and 410 to the cloud gateway 420, datacenter site 430, and branch site 440, the SD-WAN routers 414 use the network links 415-417. As discussed previously, a controller cluster 460 configures an SD-WAN router to iteratively (1) collect metrics quantifying a set of attributes of each network link in the vehicle, and (2) select different network links for forwarding data messages to components of the SD-WAN based on the collected metrics. In some embodiments, the controller cluster 460 configures an SD-WAN router (e.g., 414) to embed data messages with a sequence number for a destination router of the SD-WAN that receives the data messages. Further information regarding re-sequencing will be described below.

Figure 5:
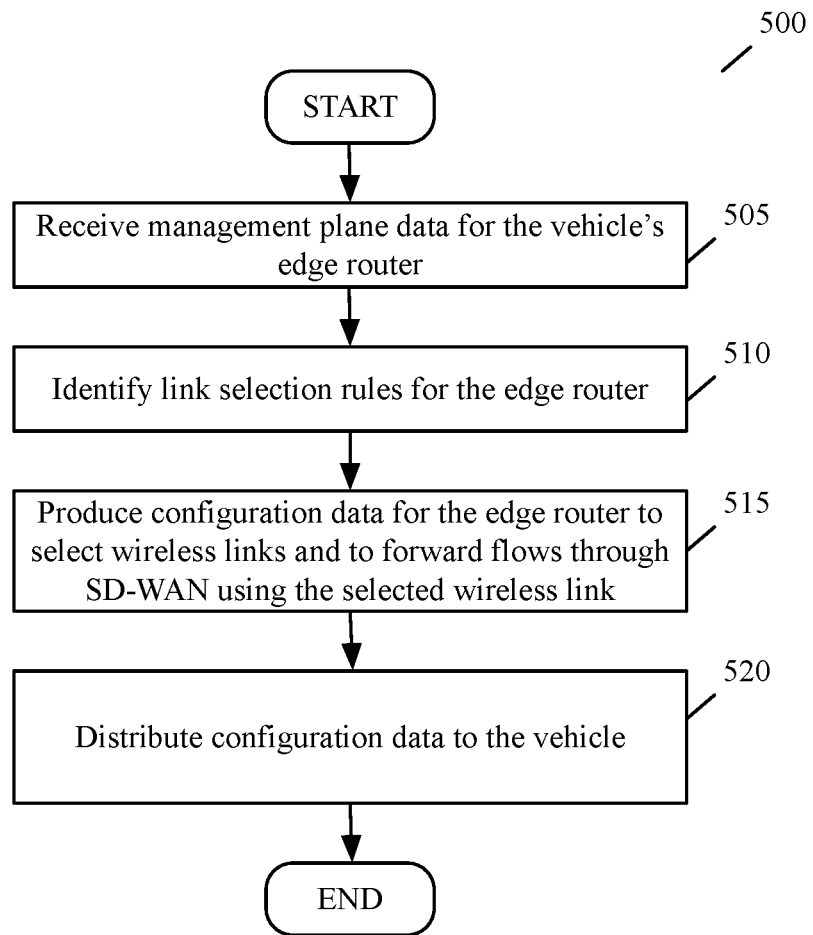
FIG. 5 conceptually illustrates a process of some embodiments for configuring an edge router of a vehicle.

FIG. 5 conceptually illustrates a process 500 used by a controller cluster 460 to configure the SD-WAN edge router (e.g., routers 214 or 414) of a vehicle. The process 500 when the controller cluster receives (at 505) input from a management plane (MP) interface, and generated configuration data based on this input. This input can come from a MP program or from an administrator of the network that interfaces with the management plane. The vehicle edge router in some embodiments is one of an edge router appliance, an edge router executing on a computer that operates in the vehicle, or an edge router executing on a machine (e.g., a VM, a Pod, or a container) that executes on the computer.

Next, at 510, the process 500 identifies a set of one or more link selection rules for the edge router of the vehicle. The link selection rules may be provided directly from a user or administrator, or the controller set may receive data from the user for the controller to generate the link selection rules. As further discussed below, the vehicle's edge router in some embodiments selects links for forwarding different flows or different data messages of a flow in order to forward data messages in an optimal configuration.

The identified set of link-selection rules in some embodiments includes a rule specifying selecting a wireless network link with a highest reliability score for a particular type of traffic (e.g., for a critical type of traffic). When forwarding a flow of this traffic type, the edge router may compute reliability scores for each of the wireless network links (e.g., using collected metrics quantifying attributes of the links) and, using the rule, select the link with the highest reliability score to use to forward the critical flow.

In some cases, the link with the highest reliability score might not have the highest transmission rate score, meaning that the most reliable link might not be the fastest. In such cases, a critical flow might not be sent along the fastest link or the link with the highest throughput, but is instead sent along the most reliable link, as specified by the rule in the rule set. The set of rules in some embodiments includes a rule specifying selecting a the fastest wireless network link that meets a threshold reliability score for a particular type of traffic. In some such embodiments, two or more wireless network links may have pre-requisite threshold reliability scores, and in such a case, the edge router would then select the network link that link that has the faster speed.

In some embodiments, the set of rules includes a rule that specifies selecting a wireless network link with a lowest transmission time score for a particular type of traffic. As discussed previously, a particular type of traffic may require being sent along the fastest wireless network link. When forwarding a flow of this traffic type, the edge router may compute transmission time scores for each of the wireless network links (e.g., using collected metrics quantifying attributes of the links) and, using the rule, select the link with the lowest transmission time score (equating to the fastest link) to use to forward the flow.

Next, the process 500 produces (at 515) configuration data for configuring the edge router to perform link selection processes based on the link selection rules for forwarding data messages along links of the vehicle, and to forward flows through the selected links. For different flows, the configuration data can configure the edge router to perform differently, e.g., to select links with different metrics and/or to select one or more links.

The process 500 then distributes (at 520) the produced configuration data to the vehicle's edge router to use to select links for the different flows and forward the flows through the selected links. In some embodiments, the configuration data configures the edge router to forward flows from a device operating in the vehicle (e.g., a computer located in the vehicle or a machine (e.g., virtual machine, Pod, container, etc.) executing on a computer located in the vehicle) to the SD-WAN. The configuration data in some embodiments configures the edge router to use its link selections to forward flows in the most optimal configuration. For instance, the controller may provide a link selection rule to the edge router specifying that a particular flow must be sent along the most reliable link.

The configuration data also configures the vehicle's edge router to connect to wireless network links in the vehicle. The configuration data also includes next-hop forwarding rules in some embodiments that direct the vehicle's edge router to forward flows to a cloud gateway, a datacenter hub (e.g., to access resources of the datacenter) and/or a branch site's edge router (e.g., to send data messages to an edge node of the branch site). After 520, the process ends.

Figure 6:
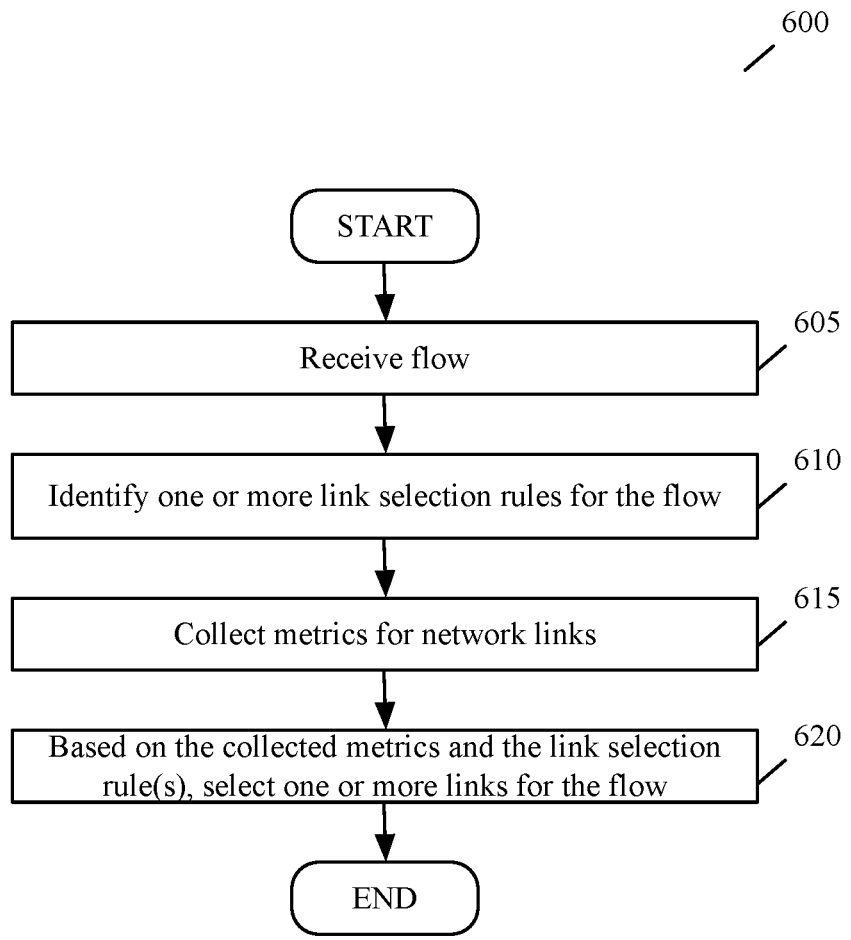
FIG. 6 conceptually illustrates a process of some embodiments for selecting one of several links for forwarding data message flows.

FIG. 6 conceptually illustrates a process 600 that the vehicle's edge router (e.g., SD-WAN router 114, 214 and 414) performs in some embodiments to select one or more links for a flow and to forward data messages of the flow along the selected link(s). The process 600 begins when the edge router receives (at 605) the first data message (e.g., the first packet) of the flow. This flow may be received from a machine executing on a computer operating on the vehicle, and may be sent to a destination machine in a datacenter or branch site connected to the SD-WAN.

At 610, the process 600 identifies one or more link selection rules for the flow. In some embodiments, the edge router receives link selection rules from the controller cluster and stores them in a local database. In some embodiments, the process selects the link selection rule(s) by matching the received flow's attributes (e.g., its five tuple attributes, and/or dynamically identified attributes, such as its AppID that identifies the type of traffic carried in the flow's payload) with the match attributes of the link selection rules that it stores in its local database. Each link-selection rule either identifies a wireless link specifically, or specifies one or more criteria for the edge router to use to select one or more wireless links for the flow.

Next, at 615, the process 600 collects metrics for the network links operating in the vehicle. In some embodiments, an identified link selection rule specifies that the particular flow must be sent along a link that is associated with certain metrics. For example, the link selection rule may specify that the particular flow must be sent along the fastest wireless network link, and the edge router must then collect metrics for each link to determine which link is fastest. One or more processes executing on the vehicle's computer continuously collect metrics for each wireless link of the vehicle, and store these metrics in a local database stored on the same or another computer operating on the vehicle. In some embodiments, the metrics are collected from the controller set that configures the edge router. Conjunctively, or alternatively, the metrics are collected from a server or another vehicle that generated the metrics and/or are collected by the edge router by performing metrics generation processes on the links, as described further below.

Based on the identified link-selection rule(s) and the collected metric, the process 600 selects (at 620) one or more links for forwarding the flow through the SD-WAN to its destination. For instance, the flow's matching link-selection rule might specify that the most reliable wireless link should be used for the flow, and based on this rule, the process 600 selects the wireless link with the most reliable metric score.

In some embodiments, the edge router identifies multiple link selection rules for the flow, specifying using different links for different data messages in the flow for optimal link configuration. In such embodiments, the edge router selects different links for different data messages in the received flow. After selecting one or more links for forwarding the flow, the edge router uses the selected link(s) to forward the data messages of the flow to its destination along the selected link(s).

Figure 7:
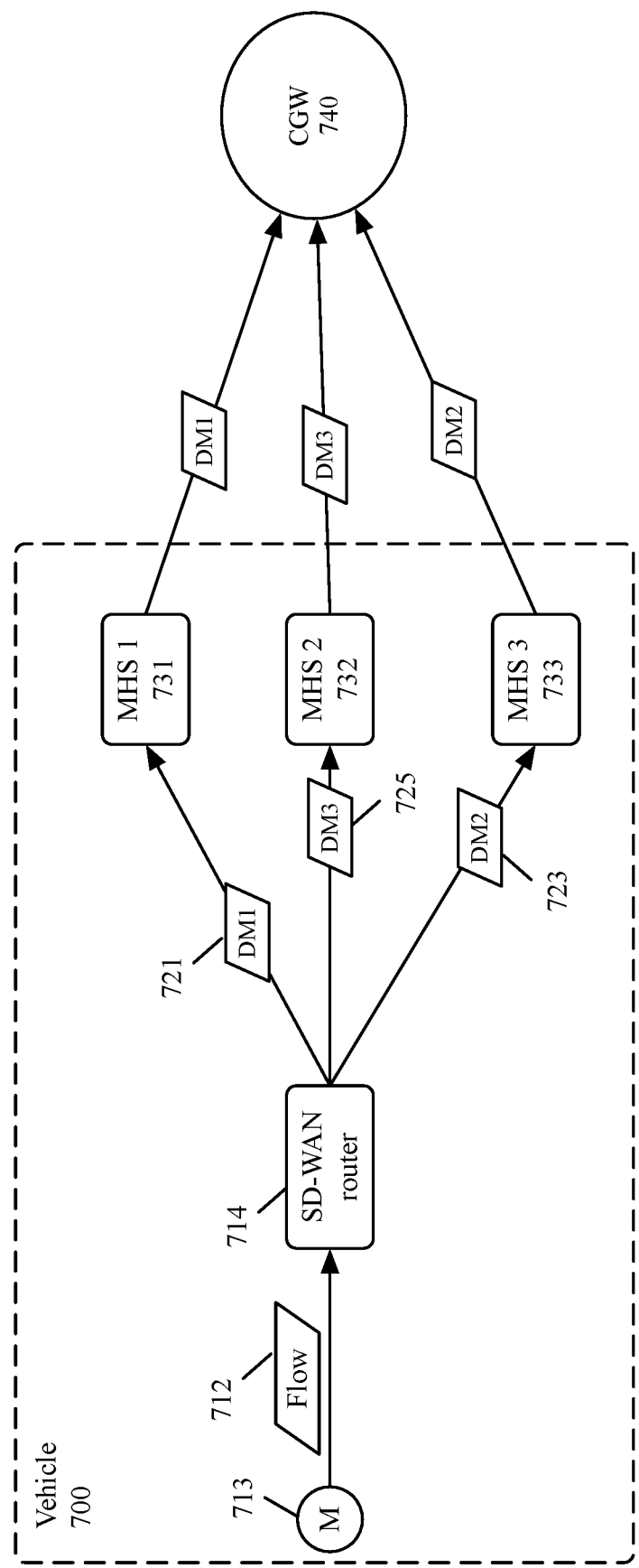
FIG. 7 illustrates an example flow being sent along different telecommunication network links from a vehicle to a destination router of an SD-WAN.

FIG. 7 illustrates an example flow 712 being sent from a machine 713 operating on a vehicle 700 to a cloud gateway 740 of an SD-WAN. The flow 712 is received by the SD-WAN router 714 for the router to forward different data messages of the flow 712 along different links. Using link selection processes, such as the process 600 of FIG. 6, the SD-WAN router 714 forwards the flow's first set of data message 721 along the first network link 731 to the CGW 740, the flow's second set of data messages 723 along the third network link 733 to the CGW 740, and the flow's third set of data messages along the second network link 732 to the CGW 740.

Figure 8:
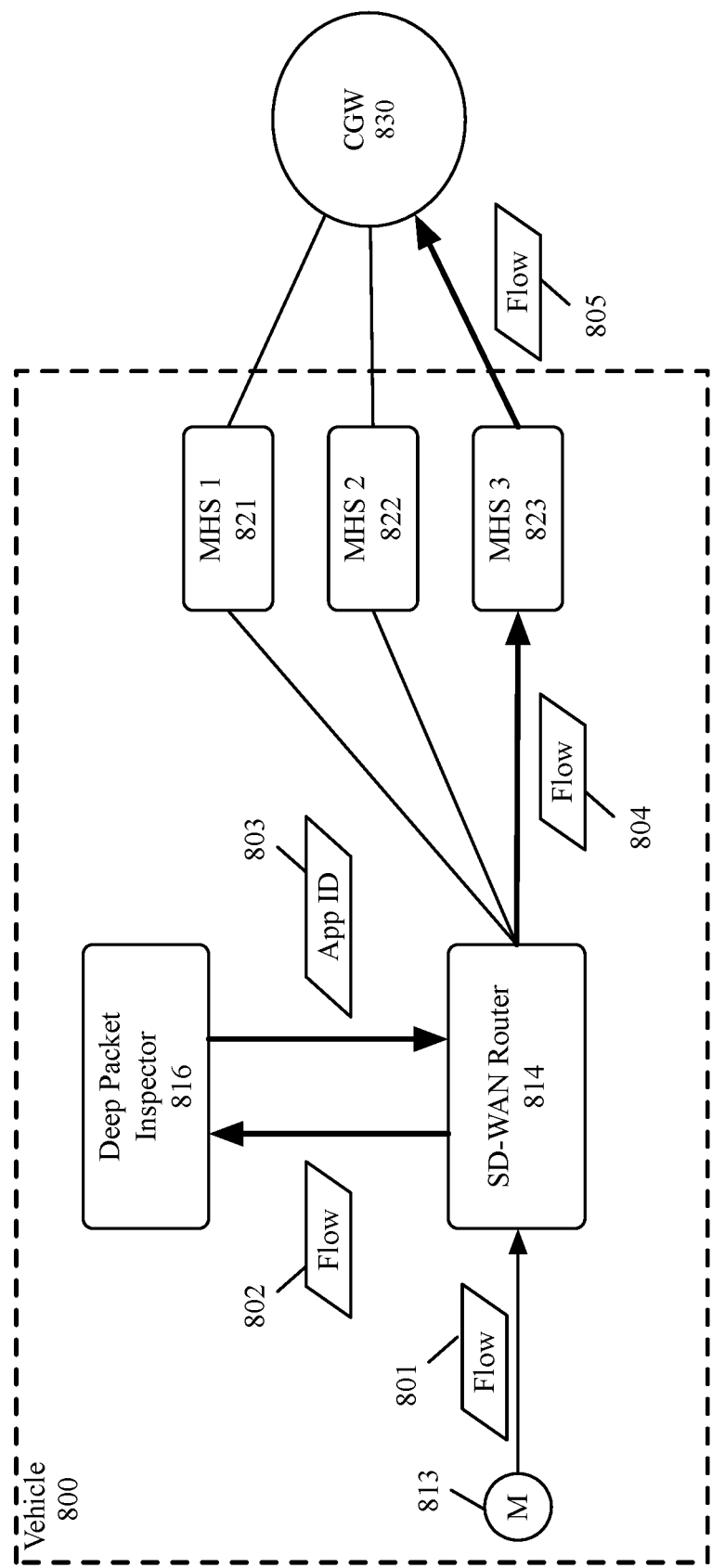
FIG. 8 illustrates an example vehicle that uses deep packet inspection (DPI) to forward flows from the vehicle to a destination in an SD-WAN using different telecommunication network links.

In some embodiments, an edge router of a vehicle uses deep packet inspection (DPI) to forward flows from the vehicle to a destination in an SD-WAN. FIG. 8 illustrates an example vehicle 800 that includes an SD-WAN router 814, a deep packet inspector 816, and wireless network links 821-823 to connect to a cloud gateway 830 of an SD-WAN. In this example, a particular flow is received (at 801) by the SD-WAN router 814 from a machine 813 executing on the vehicle 800. After receiving the flow, the SD-WAN router 814 sends the flow to the deep packet inspector 816 at 802. The deep packet inspector 816 receives the flow and performed DPI on the flow to return an application identifier (App ID) for the flow. This App ID identifies the application that is the source of the flow.

The deep packet inspector 816 then sends the App ID to the SD-WAN router 814 at 803 so the SD-WAN router 814 can select a network link for forwarding the flow to the cloud gateway 830. In some embodiments, the SD-WAN router 814 performs a link selection process similar to the process 600 of FIG. 6 by using the App ID of the flow to identify a link selection rule associated with that App ID. Once a link is selected, the SD-WAN router 814 forwards the flow along the selected link at 804 and to the cloud gateway 830 at 805. In this example, network link 823 has been selected for forwarding the flow.

In some embodiments, the SD-WAN router 814 uses the deep packet inspector 816 to perform DPI on a particular flow to identify a type of traffic carried by data messages of the particular flow. Once the App ID is received from the deep packet inspector 816, the SD-WAN router 814 can determine the type of traffic of the flow and select, based on the identified traffic type, a particular wireless network link from the several wireless network links to forward the particular flow. The type of traffic may be a critical type of traffic that requires a highly reliable wireless network link, a type of traffic that requires a fast wireless network link, or some other type of traffic that only a particular wireless network link can forward such that it satisfies the requirement(s) of that type. For example, based on the App ID from the deep packet inspector 816, the SD-WAN router 814 can determine that this flow is a critical flow. Once the flow is determined to include critical traffic, the SD-WAN router 814 can select a network link that is the most reliable. Reliability can be determined based on generated metrics for the various links 821-823. Once the most reliable link is determined, the SD-WAN router 814 can forward the critical flow along the most reliable link.

As discussed previously, an edge router can forward data messages of a flow along different wireless network links to a destination. In some embodiments, the edge router forwards the data messages to a destination router for the gateway to forward to a subsequent destination. For instance, an edge router may forward data messages of one flow along three separate network links to a gateway, and the gateway will forward the data messages to a destination edge node of a branch site. In some embodiments, because the data messages can be sent along different wireless network links, the data messages may not be received at the destination router in the same order in which they were sent. In such embodiments, the edge router may embed the data messages with a sequence number in order for the destination router to determine the correct order of the data messages and send them in the correct order. In some embodiments, the sequence numbers are embedded in a header of each data message. In other embodiments, the sequence numbers are embedded in a payload of each data message.

Figure 9:
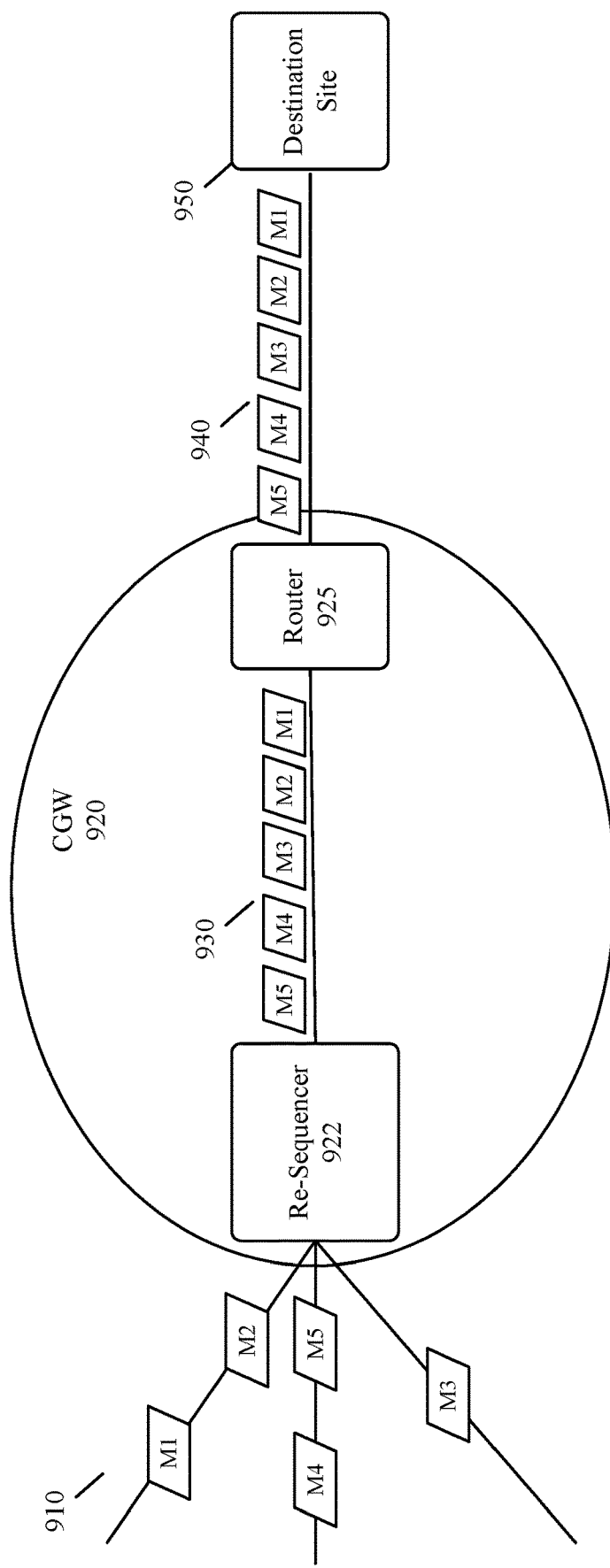
FIG. 9 illustrates example data messages that are embedded with sequence numbers for a destination router to re-sequence and forward to a subsequent destination in the correct order.

FIG. 9 illustrates an example of a flow that includes five data messages 910 being sent along three wireless network links to a cloud gateway 920. These data messages 910 are embedded with sequence numbers. The data messages 910 are received at a re-sequencer 922 of the gateway 920. The re-sequencer 922 uses the embedded sequence numbers to put the data messages in their correct sequential order, regardless of whether the re-sequencer 922 received them in that correct sequential order or not. In some embodiments, the re-sequencer 922 leaves the sequence numbers embedded into the data messages. In other embodiments, the re-sequencer 922 removes the sequence numbers from the data messages.

Once in their correct order, the re-sequencer 922 sends the data messages in the correct sequential order 930 to a router 925 of the gateway 920, for the router 940 to forward the data messages in the correct sequential order to their subsequent destination 950 in the SD-WAN. In this example, the data messages are being sent from the router 925 along different network links, shown as data messages 940. In other embodiments, however, the router 925 may forward the data messages in their correct order along a single network link to the subsequent destination. By embedding sequence numbers and re-sequencing the data messages at the destination router, it ensures that data messages are optimally sent to the destination router by being sent along different wireless network links, and that the data messages are sent in the correct order to their subsequent destination.

As discussed previously, an edge router of a vehicle may generate metrics associated with different wireless network links in order to select optimal links for forwarding data messages. For instance, an edge router may iteratively (1) collect metrics quantifying a set of attributes of each network link at different times, and (2) select different network links for forwarding data messages at different times based on the collected metrics. In some embodiments, a network link may be optimal at one time of day, and not optimal at another time of day. In order to ensure that the optimal link is used, the edge router uses the collected metrics to determine which network link is optimal at each time of the day, and uses the optimal link at any given time throughout the day for forwarding data messages.

Figure 10:
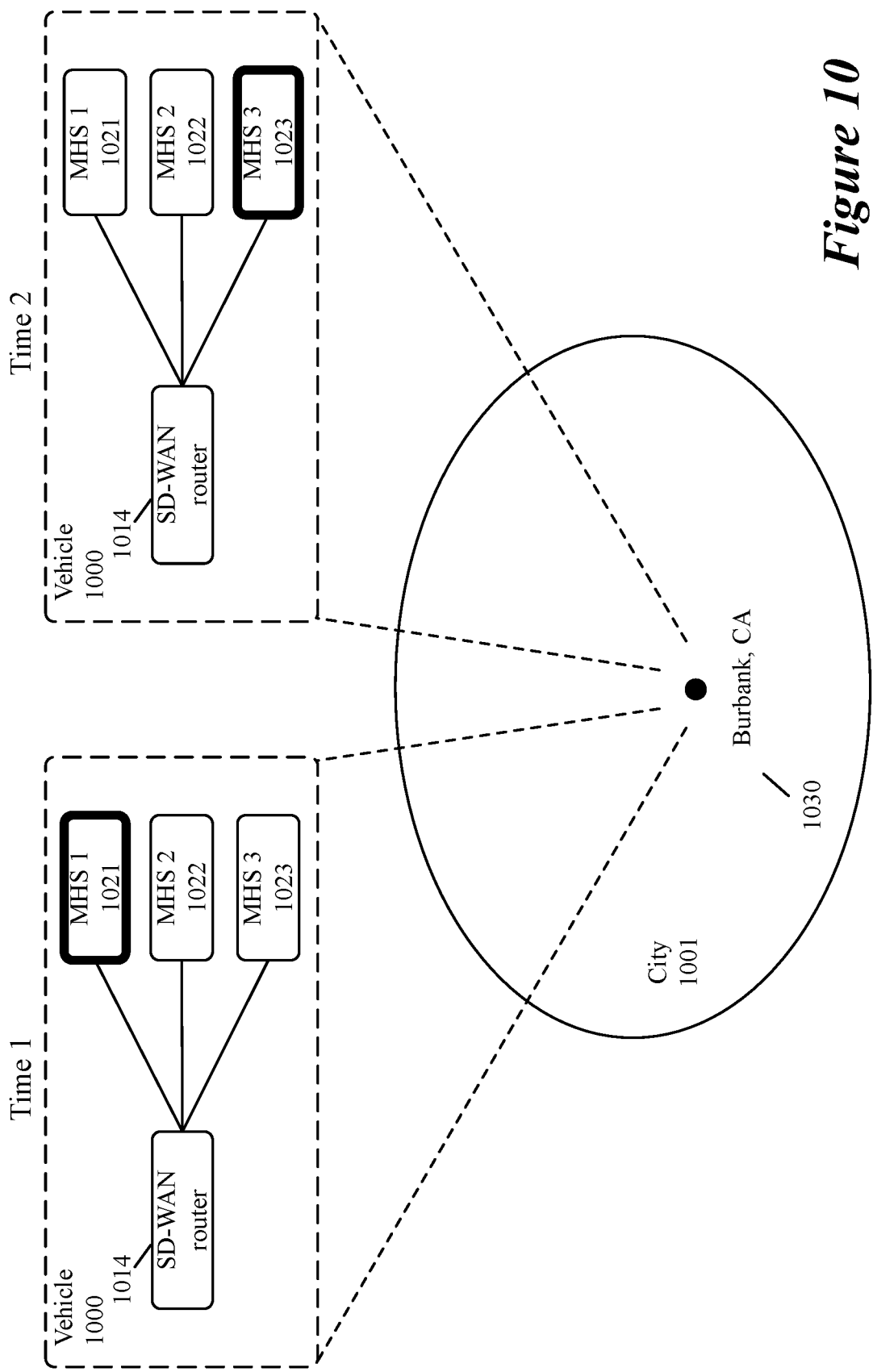
FIG. 10 illustrates an example vehicle selecting different links at different times for forwarding data message flows.

FIG. 10 present an example that illustrates selection of two different links of a stationary vehicle 1000 at two different times. The vehicle 1000 includes an SD-WAN router 1014 and network links 1021-1023 for forwarding data messages to SD-WAN destinations outside of the vehicle 1000. At both times, the vehicle is at the same location 1030 in a city 1001. In this figure, the SD-WAN router 1014 collects metrics to identify the wireless network link that is optimal to use at different times in the day.

At Time 1, the SD-WAN router 1014 has selected network link 1021 for forwarding data message flows, as shown by a bolded line. At Time 2, the SD-WAN router 1014 has selected network link 1023 for forwarding data message flows, as shown by a bolded line. In some embodiments, these different selections of links at different times in the same location may be due to differing signal strength of the network links at different times of the day. For example, network link 1021 may has the strongest signal strength at Time 1, while network link 1023 has the strongest signal strength at Time 2. Alternatively, the selection of the different links might be due to different congestion levels of the different links at different times in the day. Any metrics associated with the network links 1021-1023 may affect which link is optimal at either of the time instances, resulting in different link selections. In this example, only one link is selected at any given time, but it should be noted that in some embodiments, two or more links may be concurrently selected at any given time for a particular flow.

In some embodiments, the edge router may iteratively (1) collect metrics quantifying a set of attributes of each network link at different locations traveled by the vehicle, and (2) select different network links for forwarding data messages at the different locations based on the collected metrics. As the vehicle moves throughout different locations, the network links will strengthen or weaken as the vehicle moves closer to and farther away from different cellular towers. The edge router may collect metrics for the network links at various different locations to determine which links are optimal at the various locations, such that the edge router can forward data messages using the optimal wireless network links when the vehicle is at each location.

Figure 11:
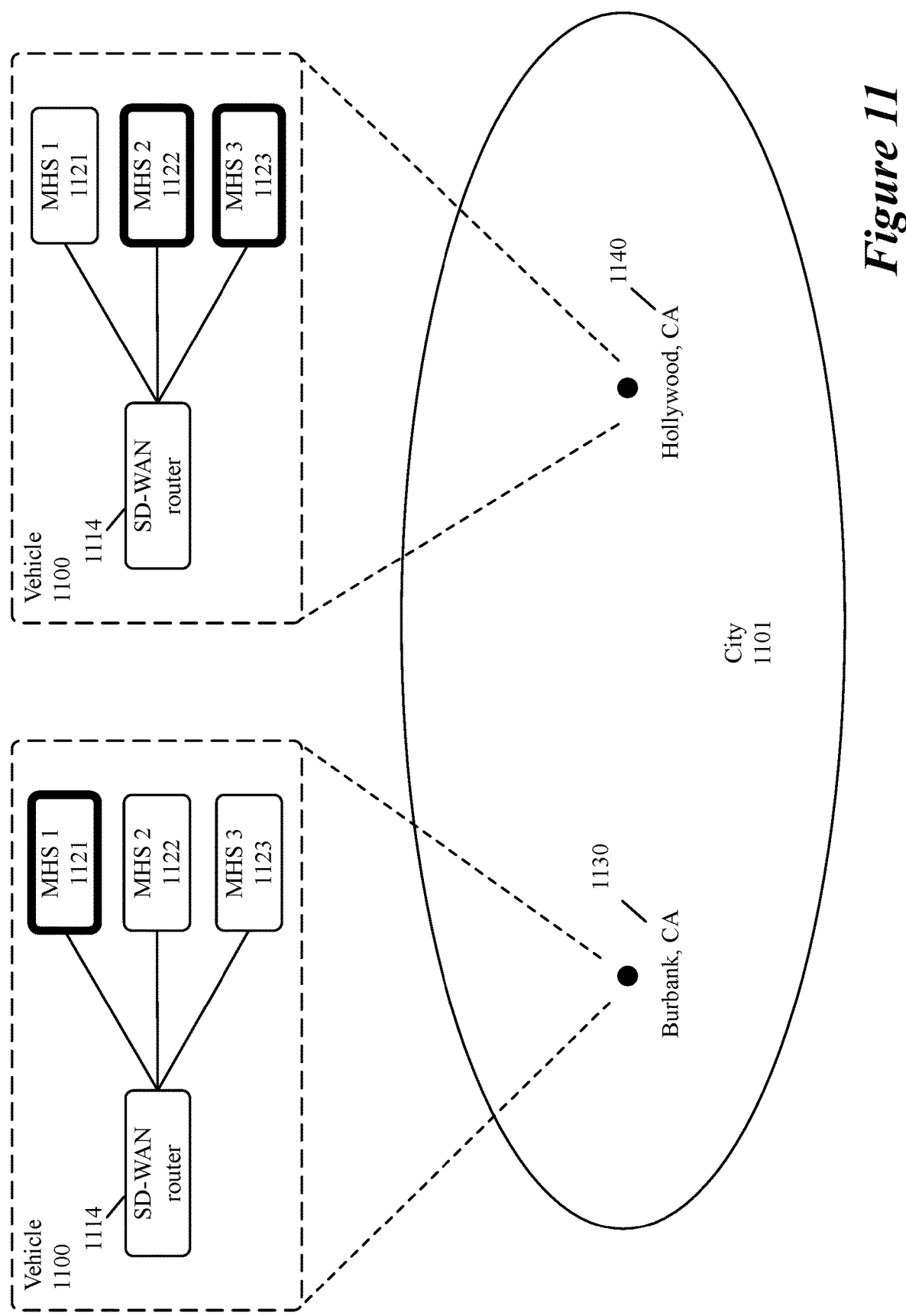
FIG. 11 illustrates an example vehicle selecting different links at different locations for forwarding data message flows.

FIG. 11 present an example that illustrates selection of two different links of a moving vehicle 1100 at two different locations in a city 1101. The vehicle 1100 includes an SD-WAN router 1114 and three network links 1121-1123. In this figure, the SD-WAN router 1114 collects metrics associated with the network links 1121-1123 to determine which links are optimal at different physical locations of the vehicle.

At a first location 1130, the SD-WAN router 1114 has selected network link 1121 for forwarding data message flows, as shown by a bolded line. At a second location 1140, the SD-WAN router 1114 has selected two network links 1122 and 1123 for forwarding data messages. In some embodiments, only one link is selected for each location of the vehicle. In other embodiments, as in this example, multiple links may be selected, e.g., based on a metric of the links meeting a minimum threshold. For example, for links selected based on signal strength, the SD-WAN router 1114 may select all links that meet or exceed a minimum signal strength, and only links not meeting that minimum signal strength are not used.

In some embodiments, distinct locations are defined such that a link selection process is performed at each of those distinct locations. For instance, a fixed distance may be defined such that for every "X" distance the vehicle travels, the edge router of the vehicle performs a link selection process to determine which link or links to use at that location of the vehicle. For example, the edge router may be configured to select new links every $\frac{1}{10}^{th}$ of a mile that the vehicle travels. In other embodiments, different location points may be defined such that when the vehicle reaches each specified location, the link selection process is performed.

Figure 12:
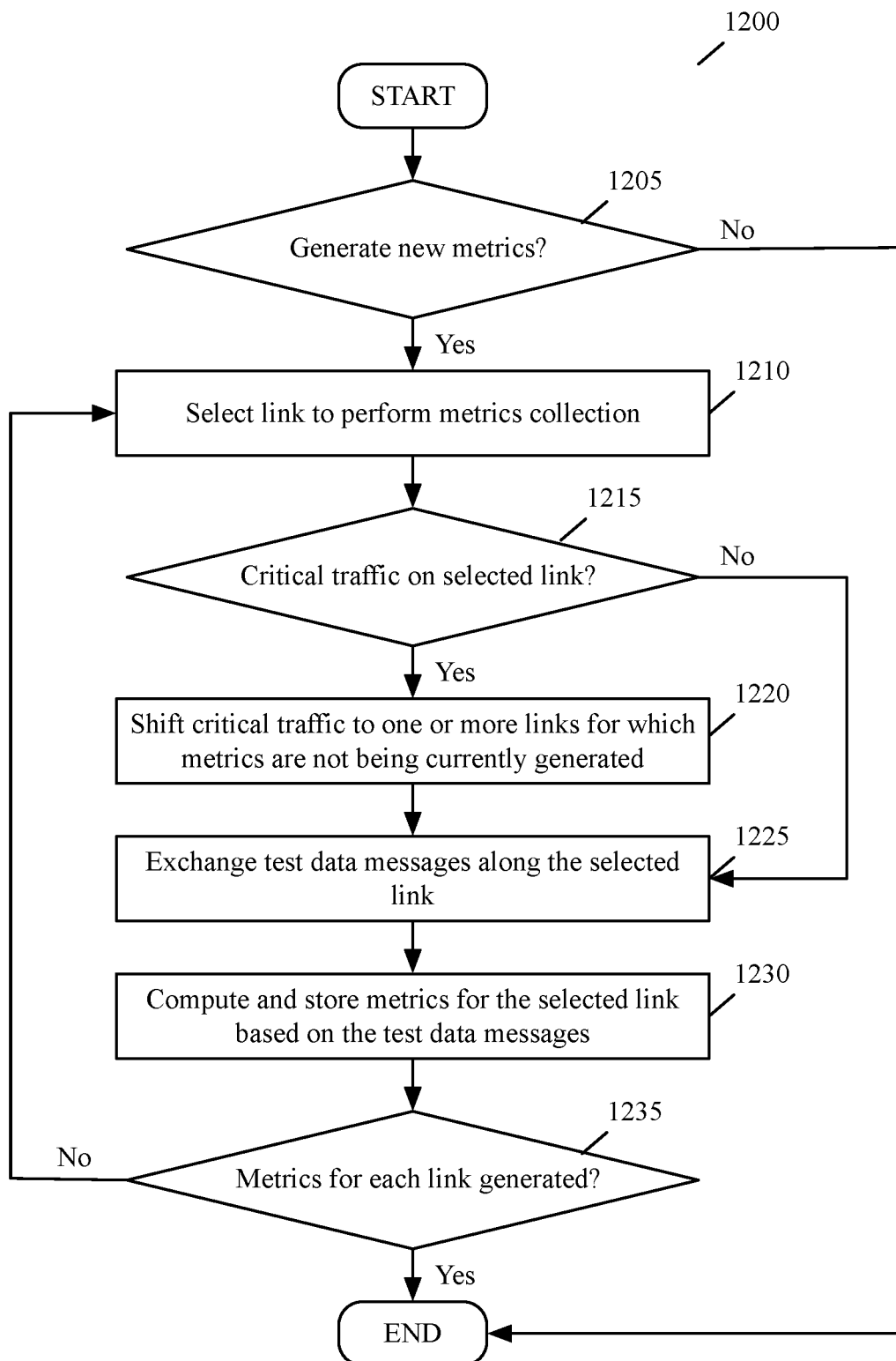
FIG. 12 conceptually illustrates a process of some embodiments for generating metrics for network links.

FIG. 12 conceptually illustrates a process 1200 of some embodiments for generating metrics associated with network links. This process may be performed by an edge router of a vehicle or a metric collector that executes along with the edge router on the vehicle. In some embodiments, this process is performed to determine the available bandwidth of each link at a particular location so that the edge router can select the optimal link or links at this location based on their available bandwidth.

The process 1200 begins by determining (at 1205) whether to generate new metrics for each link used to forward data messages from the vehicle to one or more destinations. The edge router may determine this based on the time of day if the edge router is configured to generate new metrics periodically. The edge router may also determine this based on the location of the vehicle. For instance, as the vehicle moves, the metrics generated for each link may change (e.g., as the links change distances from different cellular towers). Hence, the edge router can perform this process 1200 periodically when the vehicle is at different locations. In some embodiments, a fixed distance (e.g., specified by a user or administrator) is used to determine when the process 1200 is performed, such that the process 1200 is performed a first time at a first location, and then a second time at a second location that is the fixed distance away from the first location. These two locations in some embodiments are determined based on global positioning system (GPS) location data provided by a GPS satellite. The two locations of the vehicle in other embodiments are determined based on cellular derived location data.

If the process 1200 determines that new metrics are not to be generated, the process 1200 ends. If the process 1200 determines that new metrics are to be generated, the process 1200 selects (at 1210) a link to perform metrics collection. In some embodiments, the edge router generates metrics for each link one at a time. After selecting a link, the process 1200 determines whether any critical traffic (i.e., critical data messages) is currently being forwarded along the selected link. To facilitate metrics generation without compromising critical traffic that requires high reliability, such traffic should be first shifted to alternate available links. For example, if three carriers on three cellular links are available to the edge router, a first link would entail removal of critical traffic from this link and redistribution of this traffic across one or more of the other links during the brief period of time the metrics generation is performed for the first link.

If the process 1200 determines that critical traffic is being sent along the selected wireless network link, the process 1200 shifts (at 530) the critical data messages to be forwarded over one or more of the other links for which metrics are not being currently generated. Once metrics for the selected link is finished, the edge router may shift the critical data messages back over to this link while metrics generation is performed for the other links. If the process 1200 determines that critical traffic is not being sent along the selected link, the process 1200 proceeds to 1225. At 1225, the process 1200 exchanges test data messages with a destination router of the SD-WAN along the selected link. The edge router exchanges these test data messages with the destination router (e.g., a gateway or an edge node) in order to gather information about the selected network link. Exchanging test data messages along the selected network link includes exchanging a minimal quantity of data in order to minimize the adverse effect of ongoing SD-WAN transmissions.

After the test data messages have been exchanged, the process 1200 computes and stores (at 1230) metrics for the selected link based on the test data messages. In the example of calculating available bandwidth of the links, the edge router determines a transmission duration for each test data message exchanged along the selected link. Based on the transmission durations for each test data message, the edge router determines a transmission rate of the selected link. Based on the transmission rate, the edge router determines the available bandwidth for the selected link. The process 1200 then determines (at 1235) whether metrics have been generated for each network link connected to the edge router. If metrics have not been generated for all links, the process 1200 returns to 1200 to select a new link to perform metrics collection. If metrics have been generated for all links, the process 1200 ends.

Figure 13:
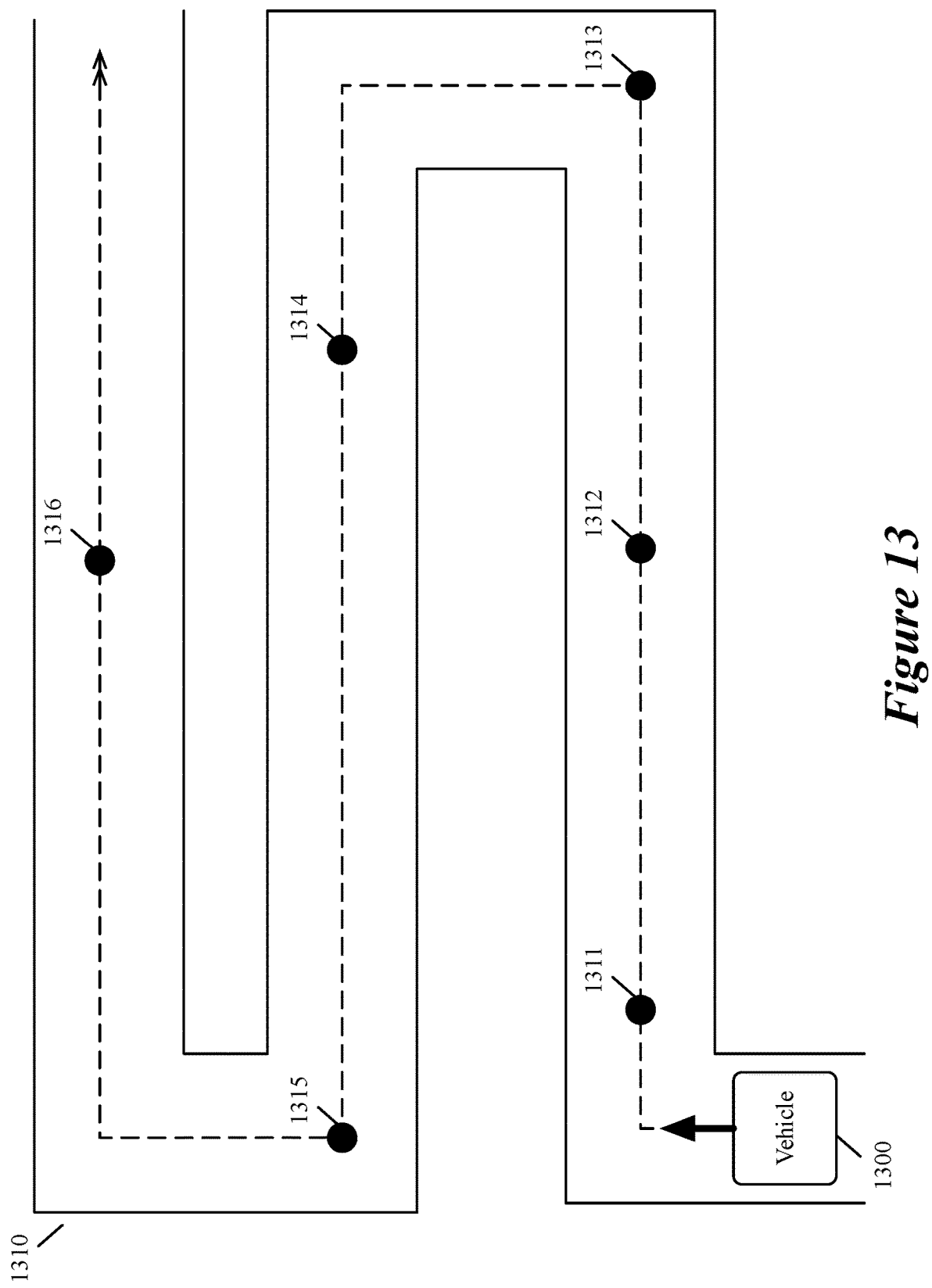
FIG. 13 illustrates an example vehicle travelling along a route for which link selections have been predicted.

In some embodiments, a vehicle proactively selects links to use at different locations along a route before it reaches these locations. FIG. 13 illustrates an example vehicle 1300 travelling along a route 1310. Before reaching any of these locations, the vehicle's SD-WAN router identifies six possible locations 1311-1316 where this router should select another wireless link for one or more flows that it might forward through the SD-WAN. To do this, the vehicle's SD-WAN router in some embodiments uses metrics that it has previously collected for these locations, and/or metrics for these locations that it collects in real time from one or more servers (e.g., the controller cluster or another server cluster) or one or more vehicles that are concurrently operating in the field.

In some embodiments, the SD-WAN router of the vehicle 1300 as it reaches each location 1311 to 1316 changes its selected wireless network link for one or more flows at this location, in order to more seamlessly transition between the network links. Alternatively, in other embodiments, the SD-WAN router simply uses the links that it identifies for each location 1311-1316 as an initial wireless link candidate for that location, and might forego using the candidate wireless link for a location if it collects metrics at the location that demonstrate that the candidate link is no longer the best link for a set of flows for which it was identified apriori as an optimal wireless link.

Figure 14:
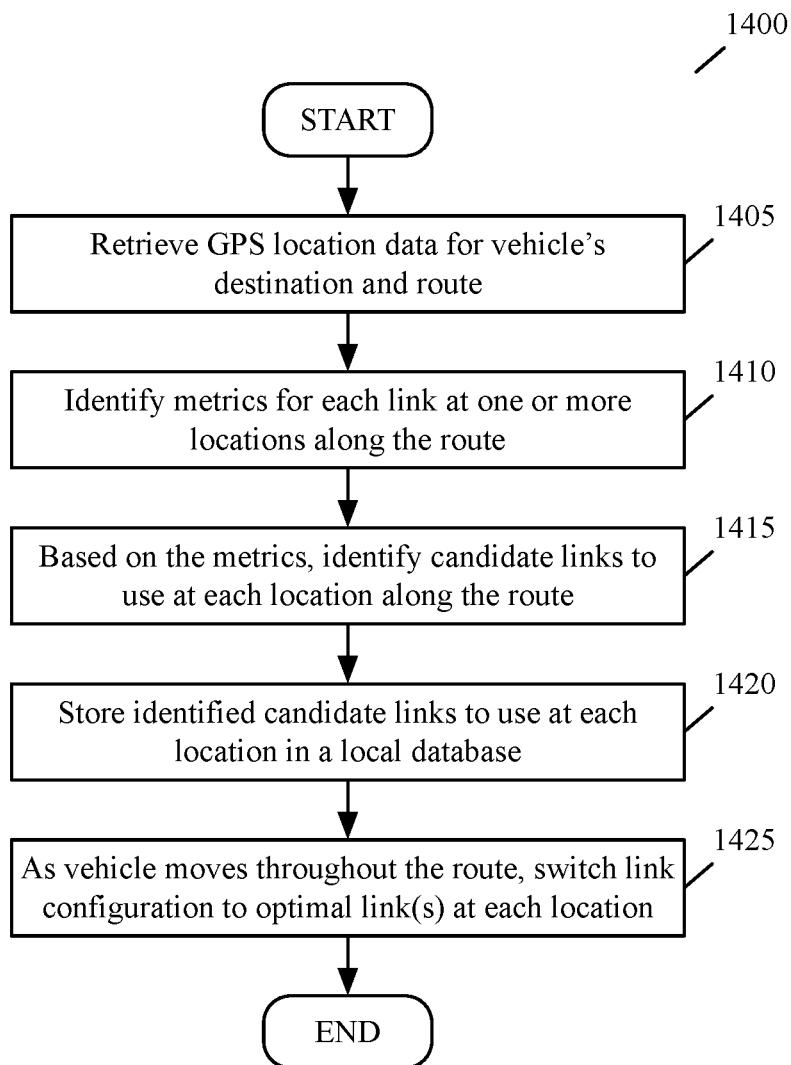
FIG. 14 conceptually illustrates a process of some embodiments for proactively selecting links along various locations of a future route of a vehicle.

FIG. 14 conceptually illustrates a process 1400 for proactively selecting links along various locations of a future route of the vehicle. This process 1400 may be performed by an edge router of the vehicle. The process 1400 begins by retrieving (at 1405) GPS location data for the vehicle's destination and the route. The edge router retrieves this data in order to plan the route that the vehicle will take and plan which links to use along the route. The GPS location data may be retrieved from a GPS satellite, a server, another vehicle, or any suitable source.

Next, at 1410, the process 1400 identifies metrics for each link at one or more locations along the route. In some embodiments, these locations are defined by where the retrieved metrics were collected or generated. In other embodiments, the locations are defined by the edge router based on a configuration of the edge router. For example, the edge router may be configured to define these locations along the route based on a fixed distance such that a location is defined along every "X" distance along the route. the edge router may instead be configured to define the locations based on location definition data received from a user or administrator, specifying specific locations for which the edge router should select new links. In such embodiments, the edge router uses the received location definition data to determine one or more locations on the vehicle's route.

In some embodiments, the edge router retrieves the link metrics by computing a metrics generation process, such as the process 1200 of FIG. 12. These retrieved metrics may also be historical (i.e., previously generated or collected) metrics (1) stored in and retrieved from a local database in the vehicle, (2) retrieved from one or more servers, and/or (3) retrieved from one or more other vehicles concurrently in the field with the vehicle and/or previously in the field. The retrieved metrics in some embodiments are validated by the vehicle by running tests as the vehicle travels along a route. For instance, if the vehicle retrieves location based link metrics from another vehicle, the edge router of the vehicle may perform methods and processes to validate these metrics as the vehicle reaches the locations at which the metrics were collected.

Based on the retrieved metrics, the process 1400 identifies (at 1415) candidate links to use at each location along the route. The edge router determines optimal links for each defined location along the vehicle's route in order for the vehicle to predict which links are optimal along the route. the process 1400 then stores (at 1420) the identified candidate links to use at each location in a local database. the edge router stores the candidate link selections in a local database so the edge router can identify the candidate links as the vehicle reaches the various locations along the route.

As the vehicle moves throughout the route, the process 1400 switches (at 1425) the vehicle's link configuration to optimal link(s) at each location along the route. In some embodiments, the edge router always selects the candidate links at the various locations along the route. In other embodiments, the edge router may select the candidate links along the route, or may not select them. In such embodiments, the edge router may also generate new metrics for each location and determine a new link selection at the location. If the new link selection is different than the predicted candidate link selection, the edge router can use the new link selection. After 1425, the process 1400 ends.

Figure 15:
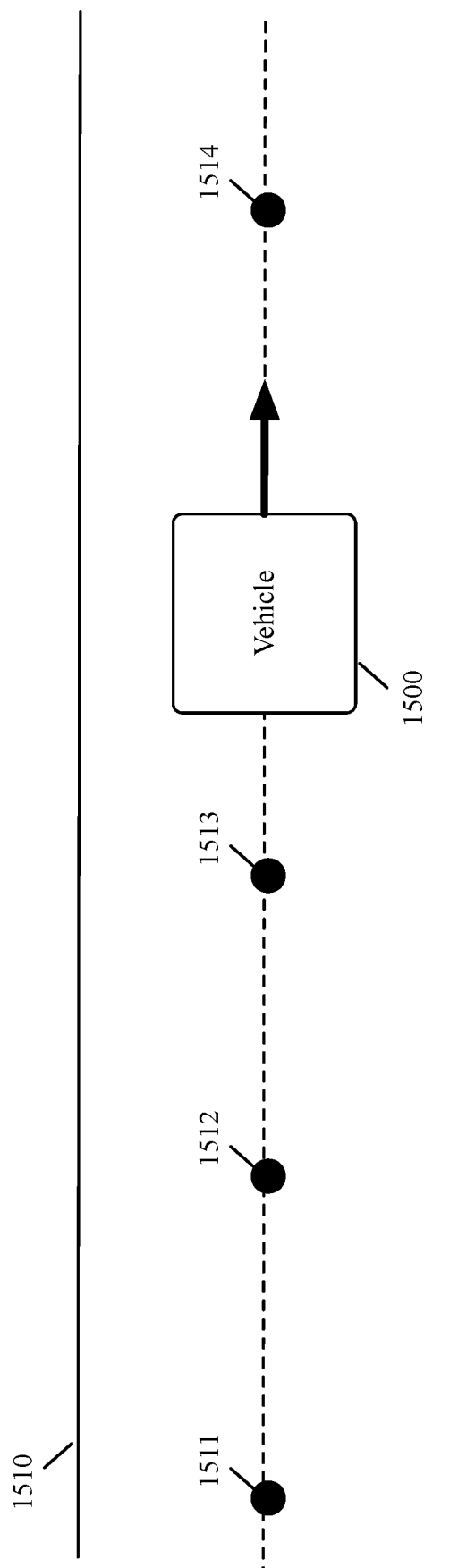
FIG. 15 illustrates an example vehicle travelling along a route in which a future location does not have a predicted link selection.

FIG. 15 illustrates an example vehicle 1500 travelling along a straight route 1510. The vehicle 1500 has collected metrics 1511-1513 for links at previous locations of the vehicle, but has not yet collected any metrics or selected any links at a future location 1514. In order to predict which link or links to use at this future location 1514, the vehicle 1500 of some embodiments uses a predictive modeling method using metrics taken at previous locations 1511-1513. In this example, the vehicle 1500 is travelling in a straight line, so the vehicle 1511 is able to use a simple distance scheme for predicting future location metrics. For instance, the vehicle 1300 is able to determine a one-dimensional distance between itself and each of the past locations 1511-1513 and the future location 1514. In other embodiments, a vehicle does not travel along a straight line. In such embodiments, the vehicle can utilize trigonometric functions to more accurately estimate the predicted link selection at future locations, based on the vehicle's direction, speed, and the estimate future location in relation to each link's previous metrics.

Figure 16:
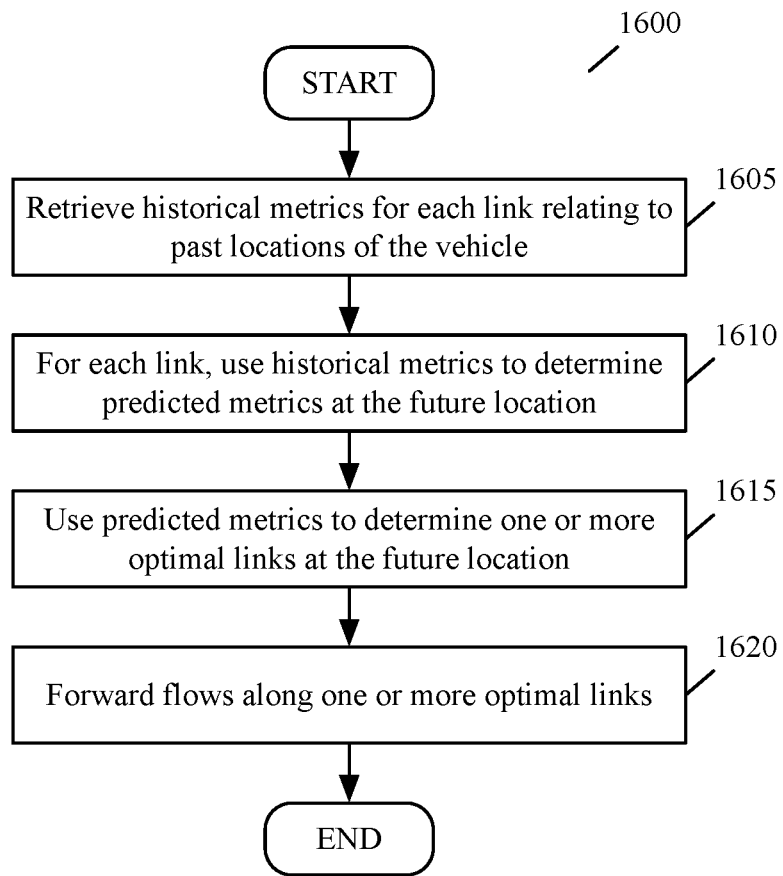
FIG. 16 conceptually illustrates a process of some embodiments for dynamically distributing data message flows across multiple network links by predicting metrics of each network link at future locations of the vehicle.

FIG. 16 conceptually illustrates a process 1600 of some embodiments for distributing data message flows across multiple network links for forwarding from a device operating in a vehicle to an SD-WAN. This process 1600 may be performed by an edge router operating in the vehicle, which may be an edge router appliance, an edge router that executes on a computer that operates in the vehicle, or an edge router that executes on a machine that executes on the computer. This process 1600 dynamically distributes data message flows among network links by predicting metrics of each network link at future locations of the vehicle. For instance, this process 1600 can be used to predict signal strength of each network link at the vehicle's future locations and select links based on the predicted signal strength.

The process 1600 begins by retrieving (at 1605) historical metrics for each link relating to past locations of the vehicle. The edge router may retrieve these metrics from a local database (e.g., if the edge router previously generated these metrics), from a server, or from another vehicle that generated the metrics. In some embodiments, the edge router retrieves these metrics by sending an application programming interface (API) request to a networking interface to request the metrics. The networking interface then sends back an API response which includes the requested metrics. In some embodiments, these metrics are performance metrics of the network links, such as signal strength metrics, transmission rate metrics, etc. In other embodiments, these metrics are non-performance metrics. Still, in other embodiments, the metrics are a combination of performance and non-performance metrics. The metrics received for each network link include metrics for multiple locations traversed by the vehicle. In some embodiments, the previous locations, the current location, and the future location of the vehicle are determined based on GPS location data provided by a GPS satellite. In other embodiments, the past, current, and future locations are determined based on cellular derived location data.

Next, for each link, the process 1600 uses (at 1610) the historical metrics to determine one or more predicted metrics at the future location of the vehicle. In some embodiments, the edge router uses the historical metrics for each link to generate a linear regression for each link. For a particular wireless network link, the edge router plots data points for metrics of the link against the locations where the metrics were collected to generate a linear regression line. This line indicates the future metrics for this link at future locations of the vehicle. Further information regarding this linear regression will be described below.

The process 1600 uses (at 1615) the predicted metrics for each link to determine one or more optimal links at the future location. The edge router determines one or more optimal links for forwarding the flows when the predicted metrics for those links at the future location exceed (or in some embodiments, meet or exceed) a particular minimum threshold. The edge router does not determine a link as optimal when the predicted metrics for that link at the particular future location does not meet or exceed the particular minimum threshold. The minimum threshold can be determined by a user or administrator. For instance, when the edge router selects links based on signal strength metrics, the edge router uses historical signal strength metrics for each link to determine the predicted signal strength at the vehicle's future location (i.e., a particular distance away from its current location). Based on the predicted signal strengths of the links, the edge router can select the optimal links for use at the future location and ensure that non-optimal links are not used at the future location. A link is considered non-optimal when its predicted signal strength falls below a particular minimum signal strength score (i.e., the minimum threshold). When a link's signal strength falls below this minimum signal strength score, data message flows sent along this link are at risk of congestion. In order to avoid this, the edge router only uses links whose predicted signal strength stays above the desired minimum.

The process 1600 then forwards (at 1620) data message flows along one or more optimal links. In some embodiments, the edge router does this before reaching the future location. In other embodiments, the edge router waits to do this until it reaches the future location. In some embodiments, the edge router, in selecting network links based on their predicted metrics, forwards all data message flows using one network link. In other embodiments, the edge router forwards different data message flows using different network links. Still, in other embodiments, the edge router forwards different data messages of a particular flow using one network link. Once the edge router forwards the data message flows using the optimal network link or links, the process 1600 ends.

As described above, some embodiments leverage a set of dynamic assessment methodologies to establish ongoing quality assessment of each of the carrier provided data links. These assessments in some embodiments measuring signal quality and estimates for bandwidth up and down on each link. SD-WAN processes (e.g., SD-WAN DMPO and other processes provide by VMware's VeloCloud technology) in some embodiments is then able to make intelligent assessment of which packets to place on each of the several link based on link quality and traffic type. For example, traffic that is meant to be highly reliable can be placed on the link deemed most reliable while traffic that may be bandwidth intensive but less sensitive to outages could be placed onto the higher speed links. Packets are given a sequence number that is embedded into the packet and captured upstream at the SD-WAN gateway device which re-sequenced these packets in their original transmission order, sending them onward to their destination from the gateway in their proper order.

Different embodiments use different methods of measuring link quality. Some embodiments use location aware spot-burst bandwidth assessment. As vehicles move at speed through the landscape, their cellular coverage conditions from the multiple carriers enabled on their SD-WAN routers may change in proportion to their speed. In short, the more rapidly vehicles move, the faster they pass through cell tower fields of coverage which may result in changing signal conditions.

To optimize bandwidth assessment, the 'GPS' location data provided either by satellite GPS or cellular derived location data is used to establish location and direction. A policy established on the SD-WAN device or SD-WAN orchestration layer can be established to indicate at which stepping distances speed tests will be performed, i.e. once the vehicle is X distance away from the last point of spot-testing in any direction, a new test will be performed. For example, whenever the vehicle is ½ mile away from the location of the last spot assessment a new spot assessment will be performed.

In a spot assessment, the vehicle will send a short burst of packets up and down on the targeted cellular link (a short speed test), to establish the available transmission rates in both directions, this testing itself being kept to a minimal quantity of data so as to minimize adverse effect to the ongoing SD-WAN production transmissions. The performance of a spot tests itself is designed to temporarily saturate a link so that its current maximum bandwidth in both directions can be established. For example, a chunk of data (a file), of fixed size (i.e. 250 KB), is sent to and received from a nearby SD-WAN gateway location and the duration of transmission is used to calculate the effective available bandwidth in each direction at the location of interest.

To facilitate the spot test without compromising critical traffic that requires high reliability, such traffic should be first shifted to alternate links available on the SD-WAN device. For example, if three carriers on through cellular links are available to the SD-WAN device, testing link #1 would entail removal of 'critical traffic' from link #1 and redistributing across links #2 and #3 during the brief period of the burst test on Link #1.

For example, if the SD-WAN device has 3 links from 3 separate carriers, with estimated approximately 15 Mbit/s bandwidths down and 5 Mbit/s up on each link, in a scenario where a total of 24 Mbit/sec of traffic is currently being received and 9 Mbit/sec is being sent, these traffic streams will be initially spread across the 3 links in approximately equal measure with 8 Mbit/sec being received on each link and 3 Mbit/sec being sent on each link.

During the interval of the test, the SD-WAN device has some outbound traffic designated as 'critical traffic' on link 1–, so this is initially skipped, and will be revisited after other links complete their tests. Link 2 is then targeted for the initial test, and there may be no critical traffic on link 2, so a burst of traffic is placed on this link in addition to the traffic load it is already carrying with the test traffic stream generating 9 Mbit/sec download speed in addition to its current traffic, yielding a download speed estimate of 17 Mbit/sec, and a total of 2.7 Mbit/sec upload for a total estimate of 5.7 Mbit/sec upload speed. Upon completion of this test and a similar test on link #3, the test resumes on link #1 but the critical traffic is still on link #1 so it is relocated to links 2+, the relocated traffic streams can be resume on Link #1, and the process can then repeat for Link #2 and Link #3.

While burst testing on multiple links in parallel is possible, it is only advised if the critical path traffic flow rates can be safely redistributed across the other available links without exceeded their estimated maximum bandwidths. Once the bandwidth estimates of the 3 links are establish at the spot-test location, traffic can then be placed across these links in an optimal placement configuration based on the newly established bandwidth of each link, until the next spot-test location is reached at which time the process will repeat. The strict adherence to the distance-based testing protocol can be further optimized based on the current traffic pattern, with spot tests being delayed or skipped if all links are very active or critical traffic flows cannot be placed onto a subset of the links to facilitate a link test.

Another method uses Radio Telemetry Based Reliability Assessment. In some configurations, the cellular radios used by the SD-WAN device will enable access to radio level telemetry through an API call made to their networking interface. An example includes the Multitech r100 series, which performs LTE to ethernet bridging functions, allowing the SD-WAN device to engage with it as a generic network WAN connection. It does however also provide an API which can be interrogated by the SD-WAN device at will through the network interface to obtain real-time radio signal quality measurements such as signal strength measurements.

This capability allows for an enhanced method of assessing link quality and reliability than the above-described dynamic spot testing method can provide on its own. While the spot testing method provides ongoing bandwidth assessments, it yields less information about the future reliability of each of the underlying cellular links which may potentially degrade rapidly after a short distance in some cases due to features of the landscape, or other factors.

In this method, a regular location-based model informed by GPS based location is merged with a predictive model of signal strength generated by an ongoing linear regression model which is formed based on signal strength measurements from recent measurements taken at a regular distance such as $\frac{1}{10}^{th}$ of a mile. These historical measurements are used to predict a forward looking linear regression based line indicating likely future signal strength in the direction of travel.

In the event that the forward predicting line passes below a signal quality threshold defined by policy within the orchestration layer or SD-WAN device, the SD-WAN packet schedule will pre-emptively shift packets away from the link(s) predicted to fall below acceptable quality and only link predicted to maintain, improve, or otherwise stay above the 'signal floor' defined. This pre-emptive action will allow for quality to be maintained with higher probability of short micro-outages that may occur while the SD-WAN software otherwise reactively moves packets onto better links upon detection of link degradation during a next-burst spot test or in response to actually degraded network packet flows.

Figure 17:
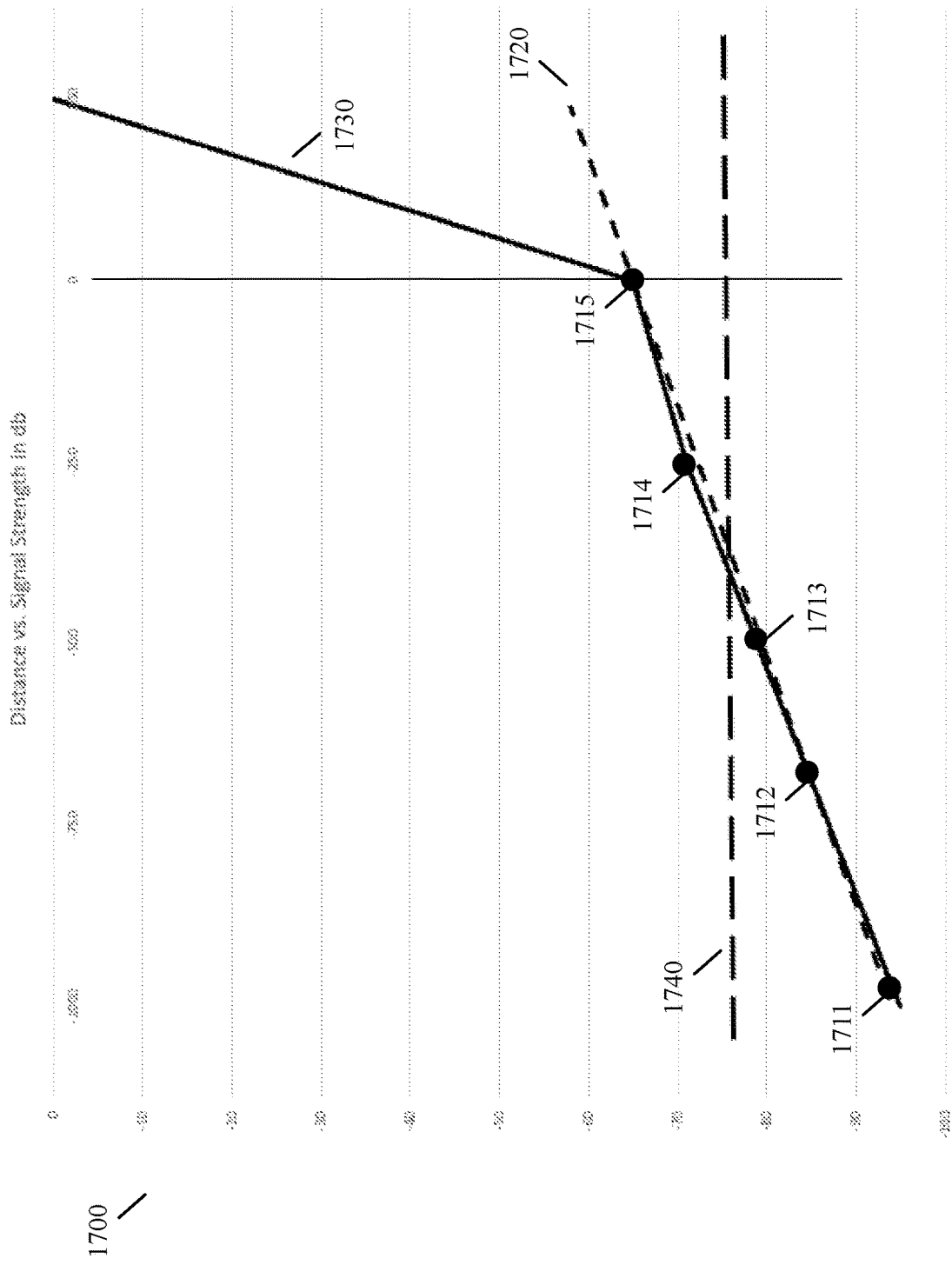
FIG. 17 illustrates an example linear regression graph generated for predicting metrics of a particular link at a vehicle's future location.

FIG. 17 illustrates an example linear regression graph 1700 generated by an edge router for selecting network links based on predicted metrics. The graph 1700 shows five collected metrics as datapoints 1711-1715. These datapoints 1711-1715 each correspond to a metric retrieved for a given wireless network link at a different location of the vehicle. In this example, metrics are collected for signal strength (in decibels (dB)) at various distances from the current location of the vehicle. A linear regression line 1720 is drawn to correlate the datapoints 1711-1715 into a single line. Using this line, a predicted signal quality line 1730 is plotted to show the predicted signal strength of the network link at future locations of the vehicle. If the predicted signal quality line 1730 were to fall below the minimum signal strength threshold 1740 set by a defined policy, the edge router would be able to determine that this link is not optimal for use along the vehicle's future route. In this example, using the minimum threshold 1740, the edge router can determine that this network link's signal strength at future locations is predicted to be above the minimum signal strength quality, and the edge router can then determine that this network link is optimal for forwarding data message flows at future locations of the vehicle.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 18:
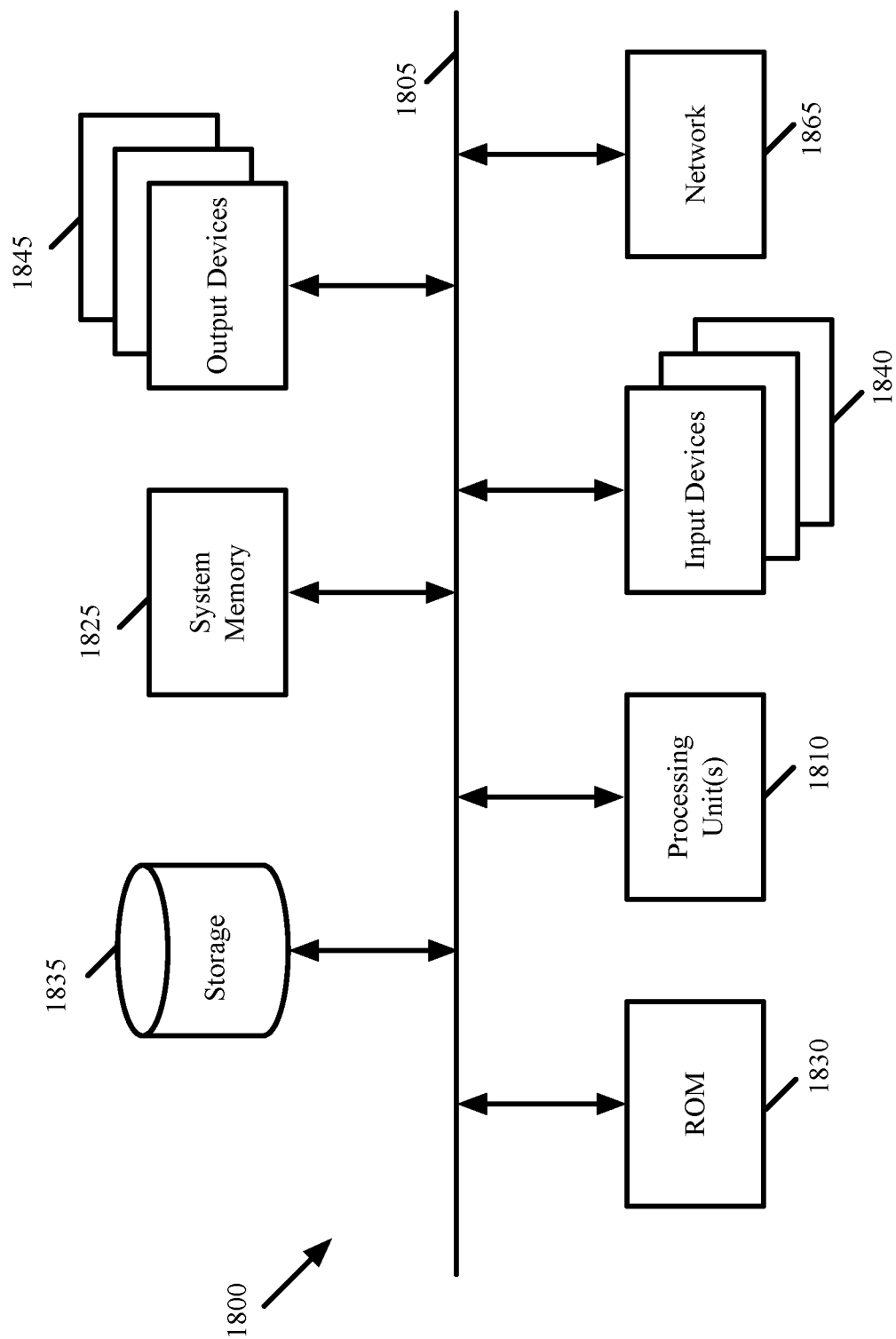
FIG. 18 conceptually illustrates an electronic system with which some embodiments of the invention are implemented.

FIG. 18 conceptually illustrates a computer system 1800 with which some embodiments of the invention are implemented. The computer system 1800 can be used to implement any of the above-described computers and servers. As such, it can be used to execute any of the above described processes. This computer system includes various types of non-transitory machine readable media and interfaces for various other types of machine readable media. Computer system 1800 includes a bus 1805, processing unit(s) 1810, a system memory 1825, a read-only memory 1830, a permanent storage device 1835, input devices 1840, and output devices 1845.

The bus 1805 collectively represents all system, peripheral, and chipset buses that communicatively connect the numerous internal devices of the computer system 1800. For instance, the bus 1805 communicatively connects the processing unit(s) 1810 with the read-only memory 1830, the system memory 1825, and the permanent storage device 1835.

From these various memory units, the processing unit(s) 1810 retrieve instructions to execute and data to process in order to execute the processes of the invention. The processing unit(s) may be a single processor or a multi-core processor in different embodiments. The read-only-memory (ROM) 1830 stores static data and instructions that are needed by the processing unit(s) 1810 and other modules of the computer system. The permanent storage device 1835, on the other hand, is a read-and-write memory device. This device is a non-volatile memory unit that stores instructions and data even when the computer system 1800 is off. Some embodiments of the invention use a mass-storage device (such as a magnetic or optical disk and its corresponding disk drive) as the permanent storage device 1835.

Other embodiments use a removable storage device (such as a flash drive, etc.) as the permanent storage device. Like the permanent storage device 1835, the system memory 1825 is a read-and-write memory device. However, unlike storage device 1835, the system memory is a volatile read-and-write memory, such a random access memory. The system memory stores some of the instructions and data that the processor needs at runtime. In some embodiments, the invention's processes are stored in the system memory 1825, the permanent storage device 1835, and/or the read-only memory 1830. From these various memory units, the processing unit(s) 1810 retrieve instructions to execute and data to process in order to execute the processes of some embodiments.

The bus 1805 also connects to the input and output devices 1840 and 1845. The input devices enable the user to communicate information and select commands to the computer system. The input devices 1840 include alphanumeric keyboards and pointing devices (also called "cursor control devices"). The output devices 1845 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 18, bus 1805 also couples computer system 1800 to a network 1865 through a network adapter (not shown). In this manner, the computer can be a part of a network of computers (such as a local area network ("LAN"), a wide area network ("WAN"), or an Intranet, or a network of networks, such as the Internet. Any or all components of computer system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media,"

and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for connecting a vehicle to a software defined wide area network (SD-WAN), the method comprising:
    deploying an edge router to operate in the vehicle;
    configuring the edge router to connect to a plurality of wireless network links operating in the vehicle; and
    configuring the edge router to forward a plurality of data message flows from a device operating in the vehicle to the SD-WAN using one or more of the plurality of wireless network links that are selected each time the vehicle travels by a predetermined distance.

2. The method of claim 1, wherein configuring the edge router to forward the plurality of data message flows comprises configuring the edge router to forward data messages of a particular flow along different wireless network links.

3. The method of claim 2, wherein configuring the edge router to forward data messages of the particular flow comprises configuring the edge router to iteratively collect metrics quantifying a set of attributes of each wireless network link at different locations traveled by the vehicle and selecting different wireless network links for the particular flow at the different locations based on the collected metrics.

4. The method of claim 2, wherein configuring the edge router to forward data messages of the particular flow comprises configuring the edge router to iteratively collect metrics quantifying a set of attributes of each wireless network link at different times and selecting different wireless network links for the particular flow at different times based on the collected metrics.

5. The method of claim 4, wherein the set of attributes of each wireless network link comprises attributes associated with at least one of reliability and speed of the wireless network link.

6. The method of claim 2, wherein configuring the edge router to forward the plurality of data message flows further comprises configuring the edge router to embed the data messages of the particular flow with a sequence number for a destination router of the SD-WAN that receives the data messages of the particular flow, to use to put the data messages that are sent along the different wireless network links in a correct sequential order before forwarding the data messages to a subsequent destination in the SD-WAN.

7. The method of claim 6, wherein the destination router is a gateway of the SD-WAN.

8. The method of claim 6, wherein the destination router is a hub forwarding node of a datacenter of the SD-WAN.

9. The method of claim 6, wherein the destination router is an edge forwarding node of a branch site of the SD-WAN.

10. The method of claim 1 further comprising:
    configuring a deep packet inspector to perform a deep packet inspection (DPI) on a particular flow to identify a type of traffic carried by data messages of the particular flow; and
    configuring the edge router to select, based on the identified traffic type, a particular wireless network link from the plurality of wireless network links to forward the particular flow.

11. The method of claim 10, wherein configuring the edge router to select the particular wireless network link based on the identified traffic type comprises providing the edge router with a plurality of rules that specify different desired link attributes for different types of traffic.

12. The method of claim 11, wherein the plurality of rules comprise a rule that specifies selecting a wireless network link with a highest reliability score for a particular type of traffic.

13. The method of claim 12, wherein the wireless network link with the highest reliability score does not have a highest transmission time score.

14. The method of claim 11, wherein the plurality of rules comprise a rule that specifies selecting a wireless network link with a pre-requisite reliability score for a particular type of traffic.

15. The method of claim 11, wherein the plurality of rules comprise a rule that specifies selecting a wireless network link with a lowest transmission time score for a particular type of traffic.

16. The method of claim 1, wherein the edge router is one of (i) an edge router appliance, (ii) an edge router that executes on a computer that operates in the vehicle, or (iii) an edge router that executes on a machine that executes on the computer.

17. The method of claim 1, wherein the device is one of (i) a machine executing on a computer that operates in the vehicle, or (ii) the computer.

18. The method of claim 17, wherein the machine is one of a virtual machine (VM), a Pod, or a container.

19. A non-transitory machine readable medium storing a program for execution by at least one processor of an edge router operating in a vehicle to connect the vehicle to a software defined wide area network (SD-WAN), the program comprising sets of instructions for:
    configuring the edge router to connect to a plurality of wireless network links operating in the vehicle; and
    configuring the edge router to forward a plurality of data message flows from a device operating in the vehicle to the SD-WAN using one or more of the plurality of wireless network links that are selected each time the vehicle travels by a predetermined distance.

20. The non-transitory machine readable medium of claim 19, wherein the set of instructions for configuring the edge router to forward the plurality of data message flows comprises a set of instructions for configuring the edge router to forward data messages of a particular flow along different wireless network links.

21. A computer system that is programmed to execute a method for connecting a vehicle to a software defined wide area network (SD-WAN), the method comprising:
    deploying an edge router to operate in the vehicle;
    configuring the edge router to connect to a plurality of wireless network links operating in the vehicle; and
    configuring the edge router to forward a plurality of data message flows from a device operating in the vehicle to the SD-WAN using one or more of the plurality of wireless network links that are selected each time the vehicle travels by a predetermined distance.

* * * * *